United States Patent
Onodera et al.

(10) Patent No.: US 8,533,850 B2
(45) Date of Patent: Sep. 10, 2013

(54) FRAUDULENT MANIPULATION DETECTION METHOD AND COMPUTER FOR DETECTING FRAUDULENT MANIPULATION

(75) Inventors: Nobuaki Onodera, Yokohama (JP); Makoto Kayashima, Yamato (JP); Shinichi Tsunoo, Sagamihara (JP); Hiroshi Nakagoe, Yokohama (JP); Hiromi Isokawa, Sagamihara (JP); Norio Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 154 days.

(21) Appl. No.: 12/937,952

(22) PCT Filed: Jun. 29, 2010

(86) PCT No.: PCT/JP2010/061013
§ 371 (c)(1),
(2), (4) Date: Oct. 14, 2010

(87) PCT Pub. No.: WO2012/001765
PCT Pub. Date: Jan. 5, 2012

(65) Prior Publication Data
US 2011/0321170 A1    Dec. 29, 2011

(51) Int. Cl.
*G06F 7/04*    (2006.01)
*G06F 17/30*   (2006.01)
*G06F 15/16*   (2006.01)
*H04N 7/16*    (2011.01)

(52) U.S. Cl.
USPC ........ 726/26; 726/3; 726/27; 726/28; 726/29; 726/30; 709/206; 709/223; 709/224

(58) Field of Classification Search
USPC .............. 726/1–4, 26–30; 709/204, 206, 709/223–226
See application file for complete search history.

(56) References Cited

U.S. PATENT DOCUMENTS

| | | | |
|---|---|---|---|
| 5,745,686 A | 4/1998 | Saito et al. | |
| 5,822,533 A | 10/1998 | Saito et al. | |
| 5,897,643 A | 4/1999 | Matsumoto | |
| 6,067,541 A | 5/2000 | Raju et al. | |
| 6,119,208 A | 9/2000 | White et al. | |
| 6,408,336 B1 * | 6/2002 | Schneider et al. | 709/229 |

(Continued)

FOREIGN PATENT DOCUMENTS

| | | |
|---|---|---|
| JP | 08-292961 | 11/1996 |
| JP | 09-044432 | 2/1997 |

(Continued)

OTHER PUBLICATIONS

U.S. Appl. No. 12/808,130, filed Jun. 14, 2010, Kayashima.

(Continued)

*Primary Examiner* — Tae Kim
(74) *Attorney, Agent, or Firm* — Foley Lardner LLP

(57) ABSTRACT

A client computer detects a user operation for transmitting data to a server or a storage device, determines whether the detected user operation is a fraudulent manipulation, and, if the determination is a positive result, performs security processing which is processing related to security of data to be transmitted. If the data is data within a group to which the user belongs and a destination of the data is a server or a storage device outside the group, the determination is a positive result.

18 Claims, 32 Drawing Sheets

(56) References Cited

U.S. PATENT DOCUMENTS

| | | |
|---|---|---|
| 6,412,017 B1 | 6/2002 | Straube et al. |
| 6,889,231 B1 | 5/2005 | Souder et al. |
| 6,996,672 B2 | 2/2006 | Lubbers et al. |
| 7,191,198 B2 | 3/2007 | Asano et al. |
| 7,788,235 B1 | 8/2010 | Yeo |
| 7,966,426 B2 | 6/2011 | Smith et al. |
| 8,011,003 B2 * | 8/2011 | Rowney et al. .......... 726/13 |
| 8,180,743 B2 | 5/2012 | Claudatos et al. |
| 8,181,036 B1 * | 5/2012 | Nachenberg ............ 713/189 |
| 8,191,156 B2 * | 5/2012 | Kubo ....................... 726/27 |
| 8,286,253 B1 * | 10/2012 | Lu et al. .................. 726/26 |
| 8,341,418 B2 * | 12/2012 | Yoshimura ............ 713/181 |
| 8,352,535 B2 * | 1/2013 | Peled et al. ............. 709/200 |
| 8,370,948 B2 * | 2/2013 | Troyansky ............... 726/26 |
| 8,407,341 B2 * | 3/2013 | Gillette et al. ........ 709/224 |
| 2001/0023486 A1 | 9/2001 | Kayashima et al. |
| 2001/0025346 A1 | 9/2001 | Kayashima et al. |
| 2002/0095592 A1 * | 7/2002 | Daniell et al. .......... 713/200 |
| 2002/0099837 A1 | 7/2002 | Oe et al. |
| 2004/0267834 A1 | 12/2004 | Sasaki et al. |
| 2005/0131902 A1 | 6/2005 | Saika |
| 2005/0134894 A1 * | 6/2005 | Littman et al. ........ 358/1.14 |
| 2005/0144308 A1 | 6/2005 | Harashima et al. |
| 2005/0288939 A1 * | 12/2005 | Peled et al. ................. 705/1 |
| 2006/0224589 A1 * | 10/2006 | Rowney et al. ............. 707/9 |
| 2007/0083938 A1 * | 4/2007 | Aoki et al. ............... 726/30 |
| 2008/0077971 A1 * | 3/2008 | Wright et al. .............. 726/1 |
| 2008/0077996 A1 * | 3/2008 | Kubo ....................... 726/27 |
| 2008/0263111 A1 | 10/2008 | Asano et al. |
| 2008/0313198 A1 | 12/2008 | Kim et al. |
| 2009/0241197 A1 | 9/2009 | Troyansky |
| 2011/0131279 A1 * | 6/2011 | Karnik .................... 709/206 |
| 2011/0289589 A1 * | 11/2011 | Kayashima et al. ...... 726/26 |
| 2012/0297463 A1 * | 11/2012 | Orbach et al. .............. 726/4 |
| 2013/0104191 A1 * | 4/2013 | Peled et al. ................. 726/1 |

FOREIGN PATENT DOCUMENTS

| | | |
|---|---|---|
| JP | 09-054735 | 2/1997 |
| JP | 11-259459 | 9/1999 |
| JP | 2001-273388 | 10/2001 |
| JP | 2002-247033 | 8/2002 |
| JP | 2002-288030 | 10/2002 |
| JP | 2003-044297 A | 2/2003 |
| JP | 2005-149243 | 6/2005 |
| JP | 2005-189995 | 7/2005 |
| JP | 2006-302170 | 11/2006 |
| JP | 2007-183911 A | 7/2007 |
| JP | 2007-334386 | 12/2007 |
| JP | 2008-052570 | 3/2008 |
| JP | 2008-102827 A | 5/2008 |
| JP | 2008-130077 A | 6/2008 |
| JP | 2008-181446 | 8/2008 |
| JP | 2008-310417 | 12/2008 |
| JP | 2009-020812 | 1/2009 |
| JP | 2009-187374 | 8/2009 |
| JP | 2009-237804 A | 10/2009 |
| JP | 2010-003051 | 1/2010 |
| JP | 2010-015543 | 1/2010 |
| JP | 2010-123112 A | 6/2010 |
| WO | WO 2008/129915 A1 | 10/2008 |
| WO | WO 2009/147855 A1 | 12/2009 |
| WO | WO-2010/074094 | 7/2010 |

OTHER PUBLICATIONS

Hitachi Software Engineering Co., Ltd, et al.; Information Security Governance; Jan. 31, 2008; pp. 65-66; 117-125 (with partial translation).

Nikkei BP Government Technology, No. 006; Dec. 15, 2004; pp. 42-48.

PCT International Search Report and Written Opinion on application No. PCT/JP2010/002461 dated Jun. 15, 2010; 11 pages.

PCT International Search Report on Application No. PCT/JP2010/061000 dated Jun. 28, 2010; 3 pages.

U.S. Appl. No. 12/934,235, filed Sep. 23, 2010, Naito et al.

U.S. Appl. No. 12/808,130, filed Jun. 14, 2010, Kayashima et al.

Ichiyanagi, Yoshima, et al.; A description model for data access control in Salvia operating system; IPSJ SIG Technical Reports; 2005-CSEC-30(33); Jul. 21, 2005; pp. 235-242.

PCT International Search Report and Written Opinion on application No. PCT/JP2010/061013 dated Oct. 5, 2010; 7 pages.

USPTO non-final action on U.S. Appl. No. 12/808,130 mailed Jun. 26, 2012; 23 pages.

USPTO Final Office Action on U.S. Appl. No. 12/808,130 mailed Jan. 23, 2013; 22 pages.

USPTO non-final action on U.S. Appl. No. 12/934,235 mailed Mar. 19, 2013; 32 pages.

* cited by examiner

Fig. 13A

| File Name | Sender Name | Hash Value |
|---|---|---|
| Specification.doc | kayashi@sdl.hitachi.co.jp | 7c080a1586d1ef8088a38465ebcaba8a |
| Customer List.xls | namba@sdl.hitachi.co.jp | ef8088a38465ebca7c080a1586d17c08 |

```
[aaa]
From=XXXX
Server=XXXX
URL=XXXX
```

| # | Operational Log Acquisition Item | Input Source | Output Destination |
|---|---|---|---|
| 1 | File Copy | X | Y |
| 2 | File Migrate | X | Y |
| 3 | File Name Change | — | — |
| 4 | File Create | — | — |
| 5 | File Delete | — | — |
| 6 | Folder Copy | — | — |
| 7 | Folder Migrate | — | — |
| 8 | Folder Name Change | — | — |
| 9 | Folder Create | — | — |
| 10 | Folder Delete | — | — |
| 11 | Web Upload | — | O |
| 12 | Web Download | O | — |
| 13 | FTP Send | — | O |
| 14 | FTP Receive | O | — |
| 15 | Attachment Send | — | O |
| 16 | Attachment Receive | O | — |
| 17 | Attachment Save | O | — |
| 18 | Print | — | — |

Fig. 26

| # | Management Area / Input Source | Local | Remote | Remo-vable | CD-ROM | RAM Disk | Not Acqui-rable |
|---|---|---|---|---|---|---|---|
| 1 | Local Drive | — | — | — | — | — | — |
| 2 | Remote Drive | ○ | — | ○ | ○ | ○ | ○ |
| 3 | Removable Drive | — | — | — | — | — | — |
| 4 | CD-ROM Drive | — | — | — | — | — | — |
| 5 | RAM Disk Drive | — | — | — | — | — | — |
| 6 | Drive Information Not Acquirable | ○ | — | ○ | ○ | ○ | ○ |

Fig. 27

| # | Output Destination / Management Area | Local | Remote | Remo-vable | CD-ROM | RAM Disk | Not Acqui-rable |
|---|---|---|---|---|---|---|---|
| 1 | Local Drive | — | — | O | O | — | O |
| 2 | Remote Drive | — | — | O | O | — | O |
| 3 | Removable Drive | — | — | — | — | — | — |
| 4 | CD-ROM Drive | — | — | — | — | — | — |
| 5 | RAM Disk Drive | — | — | O | O | — | O |
| 6 | Drive Information Not Acquirable | — | — | O | O | — | O |

Fig. 29

| Date And Time Of Operation | Client Identifier | Opera-tion Type | Operation Type Sub Code | Fraudulent Manipulation Check Flag |
|---|---|---|---|---|
| YYYY-MM-DDTHH:MM:SS+xx:xx | deviceAxxxx | 1 | 101 | 1 |
| YYYY-MM-DDTHH:MM:SS+xx:xx | deviceBxxxx | 2 | 202 | NULL |
| YYYY-MM-DDTHH:MM:SS+xx:xx | deviceAxxxx | 5 | 502 | NULL |
| YYYY-MM-DDTHH:MM:SS+xx:xx | deviceAxxxx | 1 | 102 | NULL |
| YYYY-MM-DDTHH:MM:SS+xx:xx | deviceCxxxx | 4 | 402 | NULL |
| YYYY-MM-DDTHH:MM:SS+xx:xx | deviceBxxxx | 3 | 307 | 1 |
| YYYY-MM-DDTHH:MM:SS+xx:xx | deviceAxxxx | 5 | 502 | NULL |
| YYYY-MM-DDTHH:MM:SS+xx:xx | deviceDxxxx | 2 | 202 | 1 |
| YYYY-MM-DDTHH:MM:SS+xx:xx | deviceAxxxx | 6 | 601 | NULL |

Fig. 30

| Date And Time Of Occurrence | Source Of Occurrence | Account Of Source Of Occurrence | Operation Details | Operation |
|---|---|---|---|---|
| 2010/06/04 17:51:30 | deviceBxxxxx | deviceBxxxxx¥Administrator | Accessed Website Of Http://Www.Itg.Xxxxx.Html | Web Access |
| 2010/06/04 17:50:05 | deviceAxxxxx | deviceAxxxxx¥Administrator | Changed Folder Name Of E:¥ New Folder To E:¥ Test | Folder Name Change |
| 2010/06/04 17:49:23 | deviceAxxxxx | deviceAxxxxx¥Administrator | Created E:¥ New Folder | Folder Create |
| 2010/06/04 17:49:05 | deviceBxxxxx | deviceBxxxxx¥Administrator | Received Email Attached With Confidential.Txt | Email Receive (With Attachment) |
| 2010/06/04 17:21:01 | deviceAxxxxx | deviceAxxxxx¥Administrator | Uploaded A.File To Http://Www.Xxxx | File Upload |
| 2010/06/04 17:19:09 | deviceAxxxxx | deviceAxxxxx¥Administrator | Downloaded A.File From Http://Www.Xxxx | File Download |
| 2010/06/04 17:10:05 | deviceCxxxxx | deviceCxxxxx¥Administrator | Changed Folder Name Of C:¥ Test To C:¥ Test2 | File Name Change |
| 2010/06/04 17:00:40 | deviceCxxxxx | deviceCxxxxx¥Administrator | Created C:¥ Test | Folder Create |

Fig. 31

| Confirmation Status | Importance | Description | Registration Date And Time | Type | Source Of Occurrence |
|---|---|---|---|---|---|
| Uncon-firmed | Emergency | Accessed Website Of Http://Www.Itg.Xxxxx.Html | 2010/06/04 17:51:30 | Security | deviceBxxxxx |
| Confirm-ed | Information | Changed Folder Name Of E:¥ New Folder To E:¥ Test | 2010/06/04 17:50:05 | Security | deviceAxxxxx |
| Uncon-firmed | Information | Created E:¥ New Folder | 2010/06/04 17:49:23 | Security | deviceAxxxxx |
| Uncon-firmed | Warning | Received Email Attached With Confidential.Txt | 2010/06/04 17:49:05 | Security | deviceBxxxxx |
| Confirm-ed | Warning | Uploaded A.File To Http://Www.Xxxx | 2010/06/04 17:21:01 | Security | deviceAxxxxx |
| Confirm-ed | Warning | Downloaded A.File From Http://Www.Xxxx | 2010/06/04 17:19:09 | Security | deviceAxxxxx |
| Uncon-firmed | Information | Changed Folder Name Of C:¥ Test To C:¥ Test2 | 2010/06/04 17:10:05 | Security | deviceCxxxxx |
| Uncon-firmed | Information | Created C:¥ Test | 2010/06/04 17:00:40 | Security | deviceCxxxxx |

Fig. 32

| Value | Type |
|---|---|
| 1 | Pc/Logon Operation |
| 101 | PC Start |
| 102 | PC Stop |
| 103 | Logon |
| 104 | Logoff |
|  |  |
| 2 | Program Start/Stop |
| 201 | Program (Process) Disable |
| 202 | Program (Process) Start |
| 203 | Program (Process) Stop |
|  |  |
| 3 | File Operate |
| 301 | Copy |
| 302 | Migrate |
| 303 | Rename |
| 304 | Create |
| 305 | Delete |
| 3 | Folder Operate |
| 306 | Copy |
| 307 | Migrate |
| 308 | Rename |
| 309 | Create |
| 310 | Delete |
| 3 | File Operation Via Network |
| 311 | Web Upload |
| 312 | Web Download |
| 313 | FTP Send |
| 314 | FTP Receive |
| 315 | Attachment Send |
| 316 | Attachment Receive |
| 317 | Attachment Save |
|  |  |
| 4 | Print Operation |
| 401 | Print |
| 402 | Print Disable |
|  |  |
| 5 | External Media |
| 501 | External Media Connect |
| 502 | External Media Disconnect (Remove) |
| 503 | External Media Disable |
|  |  |
| 6 | Web |
| 601 | Web Access |

FRAUDULENT MANIPULATION DETECTION METHOD AND COMPUTER FOR DETECTING FRAUDULENT MANIPULATION

CROSS REFERENCE TO RELATED PATENT APPLICATIONS

U.S. application Ser. No. 12/934,235 filed Sep. 23, 2010 and Ser. No. 12/808,130 filed Jun. 14, 2010 are copending applications.

TECHNICAL FIELD

The present invention relates to an operation detection system, and in particular relates to a fraudulent manipulation detection system and a fraudulent manipulation detection method for detecting operations with a client computer involving a high risk that may lead to an incident of information leakage.

BACKGROUND ART

Patent Document 1 discloses an operation detection system for detecting an ill-intentioned operation or a suspicious operation. With the technology disclosed in Patent Document 1, the administrator creates ill-intentioned fraudulent manipulation patterns in advance and registers the patterns in a database of the log analyzing server, and determines the risk based on the matching degree of the contents of the pre-recorded user's operation log.

PATENT LITERATURE

[PTL 1] Japanese Patent Application Publication No. 2009-20812

SUMMARY OF THE INVENTION

Technical Problem

With the operation patterns of the technology described in Patent Document 1, although it is possible to detect the information leakage of files stored in the client PC (Personal Computer) itself, it is not possible to easily detect the leakage that is intended by the administrator of the client PC when access is made to a server computer outside the client PC.

Solution to Problem

A client computer (a client PC, for example) detects a user operation for transmitting data to a server or a storage device, determines whether the detected user operation is a fraudulent manipulation based on first and second policy information, and, if the foregoing determination is a positive result, performs security processing which is processing related to security of the data to be transmitted. If the data is data within a group to which the user belongs and a destination of the data is a server or a storage device outside the group, the determination is a positive result.

The first policy information is information including (y1) below for each (x1) below.
(x1) an identifier of a server coupled to the client computer, or information representing a type of storage device coupled to the client computer, and
(y1) information representing whether to deem a user operation for storing data acquired from the server or the storage device coupled to the client computer in a storage resource of the client computer as a fraudulent manipulation.

The second policy information is information including (y2) below for each (x2) below.
(x2) an identifier of a server coupled to the client computer, or information representing the type of storage device coupled to the client computer, and
(y2) information representing whether to deem a user operation for transmitting data in the storage resource of the client computer to the server or the storage device coupled to the client computer as a fraudulent manipulation.

BRIEF DESCRIPTION OF DRAWINGS

FIG. 13A shows a configuration of the input source DB 393. FIG. 13B shows an example of the input source identifier 1311.

FIG. 25 shows a part of the security policy.

FIG. 26 shows a part of the security policy.

FIG. 27 shows a part of the security policy.

FIG. 29 shows a configuration of the operation log storage table.

FIG. 30 is a diagram showing an example of the operation log list display screen.

FIG. 31 is a diagram showing an example of the event list display screen.

FIG. 32 shows an example of a combination of the "operation type" and the "operation type sub code."

DESCRIPTION OF EMBODIMENTS

Several embodiments of the present invention are now explained with reference to the attached drawings.

Note that there are cases in the ensuing explanation where the processing is explained with the term "program" as the subject. However, since a program performs predetermined processing while using, as needed, a storage resource (a memory, for example) and/or a communication interface device (a communication port, for example) as a result of being executed by a processor (a CPU (Central Processing Unit), for example), the term "processor" may also be used as the subject of the processing. The processing that is explained with a program as the subject may be processing to be performed by the client computer (for example, the client PC (Personal Computer) 121 of the first embodiment). Moreover, the processor may be the CPU itself or include a hardware circuit that performs a part or all of the processing to be performed by the processor. A computer program may be installed into the respective computers from a program source. A program source may be, for example, a program distribution server or a storage media.

In addition, the management system (for example, the management server 111 of the first embodiment) may comprise one or more computers. Specifically, for example, if the management computer is to display information or the management computer is to send display information to a remote computer, the management computer is the management system. Moreover, for example, if functions that are equivalent to the management computer are being realized with a plurality of computers, such plurality of computers (if a display computer is to display information, then such display computer may be included) are the management system.

Furthermore, in the ensuing explanation, a "file" is taken as an example of information to be input into the client PC and/or information to be output from the client PC and operated by the user.

EXAMPLE 1

Figure 1:
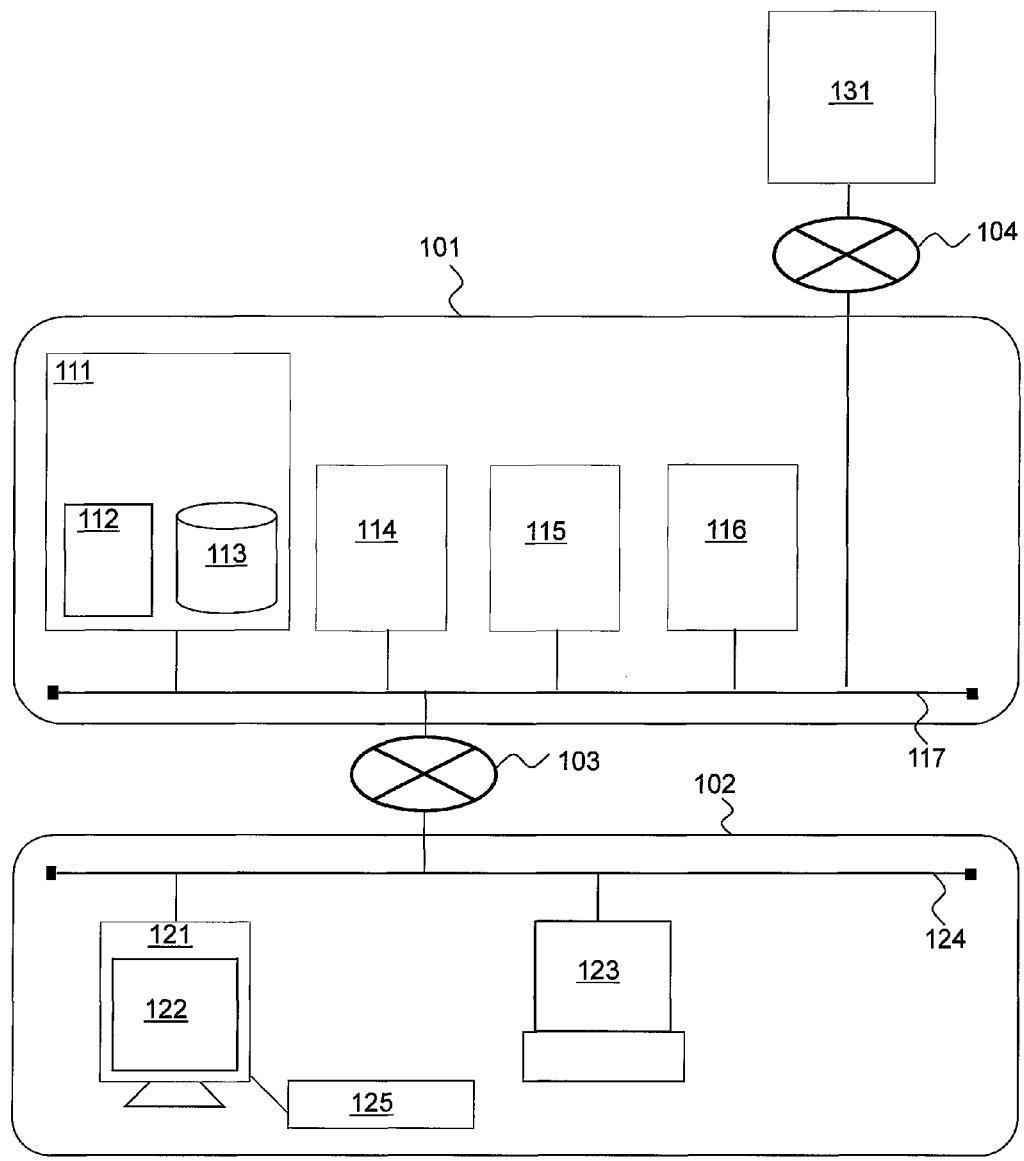
FIG. 1 shows a configuration of the fraudulent manipulation detection system according to the first embodiment of the present invention.

FIG. 1 shows a configuration of the fraudulent manipulation detection system according to the first embodiment of the present invention.

In this embodiment, the input source (for example, the download source of the file or the source of the email to which the file is attached) of the file that the user inputs into the client PC 121, and the output destination (for example, the upload destination of the file or the destination of the email to which the file is attached) of the file to be output from the client PC 121 are detected.

Specifically, in this embodiment, the agent program 122 performs the following processing:

monitors the operation (operation by a user) of the application program running on the client PC 121, if a user operates the application program to input a file into the client PC 121 so that such file can be used with the client PC 121, identifies the input source of the file to be input (input file), and assigns the identifier showing that input source (input source identifier) to the input file, if a user operates the application program to output a file from the client PC 121, identifies the output destination of the file to be output (output file) from the client PC 121, and specifies the input source identifier assigned to the output file, and performs processing according to the specified output destination and the input source that is identified based on the specified input identifier (hereinafter referred to as the "control processing"). The control processing includes, for example, at least one of the following:

to create an alert and output the alert to the management server 111, and to prohibit the output file from being output from the client PC 121 to the output destination.

As shown in FIG. 1, there is an information center 101 and a base 102. Note that in FIG. 1 the base 102 (client PC 121) is indicated singularly, but it may also be a plural number.

A LAN (Local Area Network) 117 in an information center 101 and a LAN 124 in a base 102 are coupled via a broad network 103. The information center 101 may also be coupled to the internet via a broad network 104.

The fraudulent manipulation detection system comprises a management server 111 installed in the information center 101 and a client PC 121 installed in the base 102. At least either the LAN 117 or the LAN 124 may be a communication network other than LAN.

The area that is configured from the inside of the information center 101 and the inside of the base 102 is referred to as a "management area" in this embodiment. Moreover, the equipment that is installed in the management area; for instance, an email server 114, a file server 115, an inside-organization Web server 116, a client PC 121, a network printer 123 and the like are referred to as a "management target" in this embodiment. The management server 111 manages these management targets. Note that, according to FIG. 1, although there is one client PC 121 in one base 102, there may be a plurality of client PCs 121 in one base 102.

The management server 111 comprises a manager program 112 (hereinafter sometimes referred to as a "manager"), a storage resource including a disk 113, a communication interface device (not shown) for performing communication via the LAN 117, and a processor (not shown) that is coupled to the storage resource and the communication interface device and which executes the manager program 112. The storage resource may include a memory in addition to or in substitute for the disk 113. The manager 112 governs the overall fraudulent manipulation detection system. The disk 113 stores a PC management DB (Data Base) to be used by the manager 112 for managing the client PC 121 in the fraudulent manipulation detection system. The PC management DB may also be stored in another physical storage device that can be referred to by the manager 112.

The client PC 121 comprises a communication interface device for performing communication via the LAN 124, a storage resource (a memory, for example), and a processor that is coupled to the communication interface device and the storage resource. The storage resource of the client PC 121 stores, for example, an OS (Operating System), an application program, and an agent program 122 (hereinafter sometimes referred to as an "agent"). The agent 122 monitors the user's operation made to the client PC 121 comprising that agent 122.

A user using the client PC 121 carries out one's business activities by using one or more application programs (for example, email, Web server, and file server). Thus, the information center 101 is equipped with one or more servers; for instance, an email server 114, a file server 115, and an inside-organization Web server 116 for sending and receiving information to be input and output by the one or more application programs. These servers are coupled to the LAN 117. In addition, an outside-organization Web server 131 that is accessible from the client PC 121 is coupled to the internet.

Here, for example, whether a plurality of client PCs 121 belong to the same organization may be decided based on the type of relay device existing between the client PCs 121, or based on the IP address of the plurality of client PCs 121. For example, if there is no gateway between the first client PC 121 and the second client PC 121, or, of the first IP address "aaa.bbb.ccc.ddd" of the first client PC 121 and the second IP address "eee.fff.ggg.hhh" of the second client PC 121, if they are the same up to the nth delimiter (for example, n=1 or 2), the first client PC 121 and the second client PC 121 belong to the same organization. In other words, for example, if there is a gateway between the first client PC 121 and the second client PC 121, or, of the first IP address "aaa.bbb.ccc.ddd" and the second IP address "eee.fff.ggg.hhh", if the nth delimiter is different (for example, n=1 or 2), the first client PC 121 and the second client PC 121 belong to different organizations.

Whether the input source of the file (and the output destination of the file) is inside-organization or outside-organization may be decided based on the domain name contained in the email address of the mail source, the domain name of the URL of the input source apparatus (the server, for example), or the IP address of the input source apparatus (the client PC, for example).

Moreover, a network printer 123 to be used for printing is coupled to the LAN 124 in the base 102. The removable media 125 coupled to the client PC 121 (and/or the outside-organization Web server 131) is not a management target of the management server 111 (for example, it is a verification target).

Figure 22:
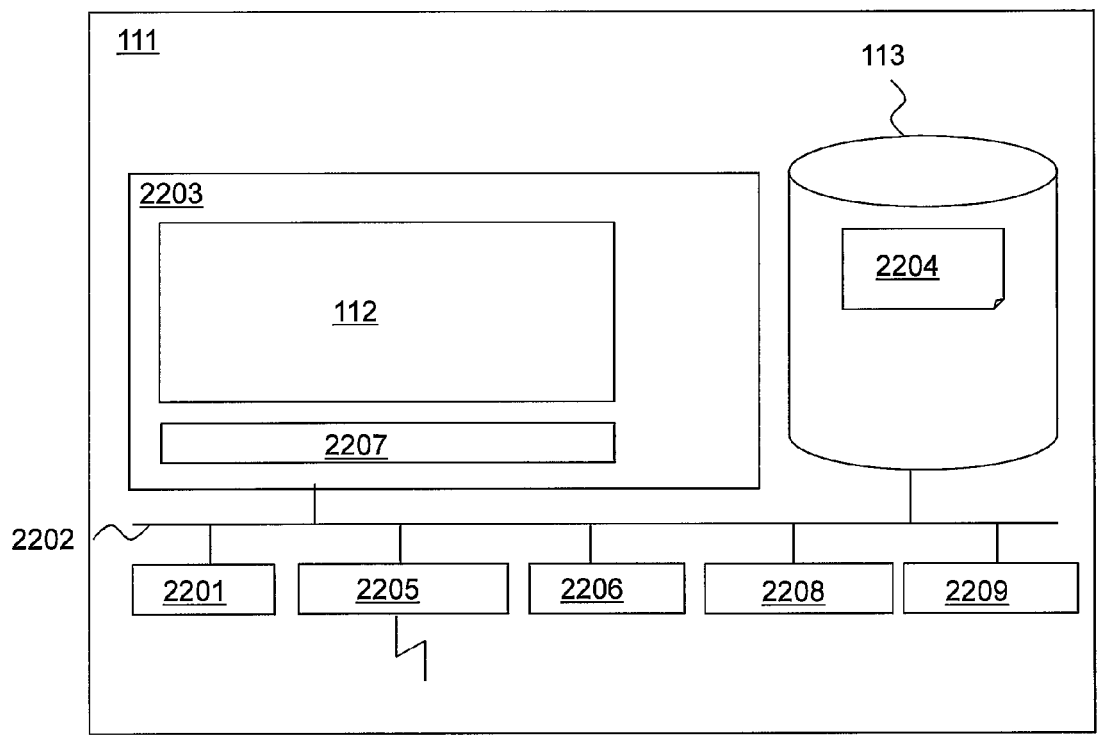
FIG. 22 shows an example of a configuration of the management server 111.

FIG. 22 shows an example of a configuration of the management server 111.

The management server 111 comprises a CPU 2201, a bus 2202, a memory 2203, a disk 113, a network I/F 2205, a device I/F 2206, a display device 2208, and an input device 2209. The disk 113 stores the PC management DB 2204. The device I/F 5206 comprises, for example, a USB (Universal Serial Bus) interface. The memory 2203 is loaded with an OS (Operating System) 2207, and the manager program 112 runs on the OS 2207. The OS 227 and the manager program 112 are executed by the CPU 2201.

Figure 2:
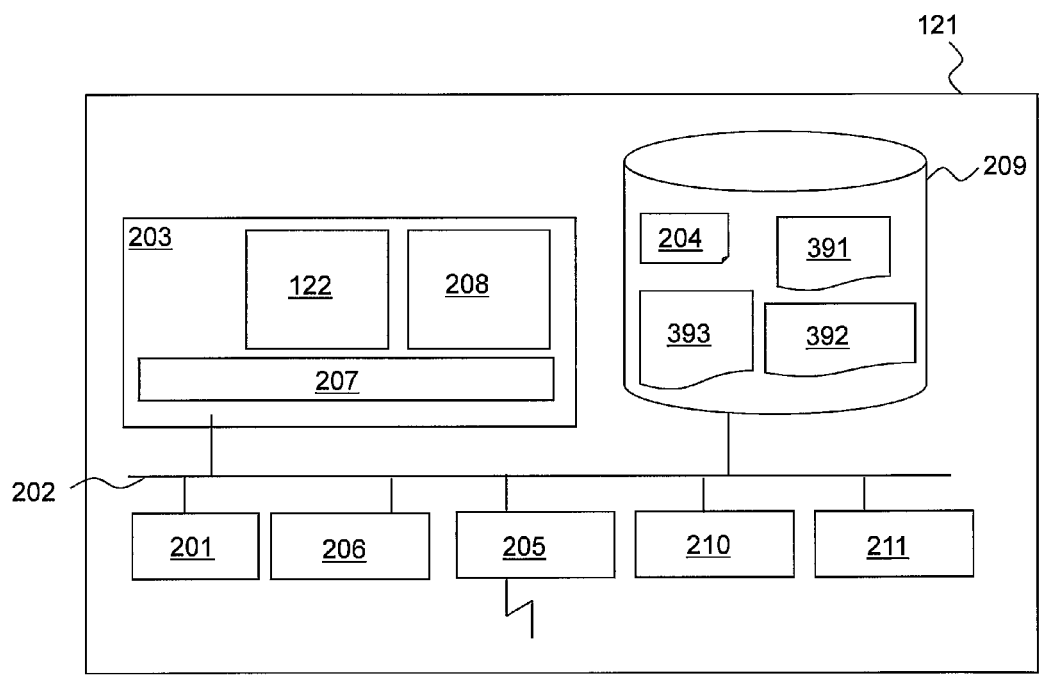
FIG. 2 shows an example of a configuration of the client PC 121.

FIG. 2 shows an example of a configuration of the client PC 121.

The client PC 121 comprises a CPU 201, a bus 202, a memory 203, a local file system 209, a network I/F 205, a device I/F 206, an input device 210, and a display device 211. The input device 210 may be, for example, a keyboard and a pointing device (a mouse, for example). The display device 211 displays a screen (a GUI, for example) that is displayed by the application program 208, and a screen (a GUI, for example) that is displayed by the agent 122. The input device 210 and the display device 211 may be configured integrally (for example, a touch-panel display device may be provided).

The device I/F 206 comprises, for example, a USB interface. The memory 203 is loaded with an OS 207, an agent 122, and one or more application programs (for example, file explorer, Web browser, mailer, word processor, spreadsheet software) 208 running thereon. The OS 207, the agent 122 and the application program 208 are executed by the CPU 201.

The local file system 209 (physical storage device) stores a system policy 391, a security policy (for example, XML (eXtensible Markup Language) format data) 392, and an input source DB 393. The security policy 392 exists, for example, for each application, and the system policy 391 may be common for all security policies 392. The security policy 392 includes information representing the conditions for performing security processing such as the processing for sending an alert (for example, information representing the conditions that are unique to the application). The system policy 391 includes operation definition information that does not depend on the application (for example, information representing which port of the management server 111 should be accessed upon communicating with the manager 112). The system policy 391, the security policy 392 and the input source DB 393 are explained later. Note that, in this embodiment, the term "application" may be a series of operations to be performed by the client PC 121 that are set forth by (A) and (B) below:

(A) one or more application programs, and
(B) at least one among (b1) configuration information of the relevant program, (b2) contents of the processing request received by the relevant program, and (b3) frequency that the relevant program receives a processing request.

Moreover, the term "security processing" refers to the processing related to the security of the file to be output (sent). The security processing may also be, for example, the processing of not outputting the file (prohibiting the output of the file) in substitute for or in addition to the processing of sending an alert.

The user may use the application program 208 to output the file 204 saved in the local file system 209 outside the client PC 121. As the type of output, for example, there are the following four types:

the user uses a file explorer and copies the file 204 to the removable media 125 coupled to the device I/F 206,
the user uses a print function of a specific application program such as a word processor or a spread sheet software and prints information contained in the file 204 from a printer such as the network printer 123, the user attaches the file 204 to the mail body created with a mailer (email software) and sends it to an inside-organization and an outside-organization client PC 121, and the user uploads the file 204 to the file server 115, the inside-organization Web server 116 or the outside-organization Web server 131.

Moreover, the user may use the application program 208 and input the file 204 from outside the client PC 121 to the local file system 209. As the type of input, for example, there are the following three types:

the user uses a file explorer and copies the file 204 in the removable media 125 coupled to the device I/F 206 to the local file system 209, the user uses a mailer and copies the file 204 attached to an email, which was addressed to that user, that arrived to the email server 114 to the local file system 209, and the user downloads the file 204 from the file server 115, the inside-organization Web server 116 or the outside-organization Web server 131 to the local file system 209.

Figure 21:
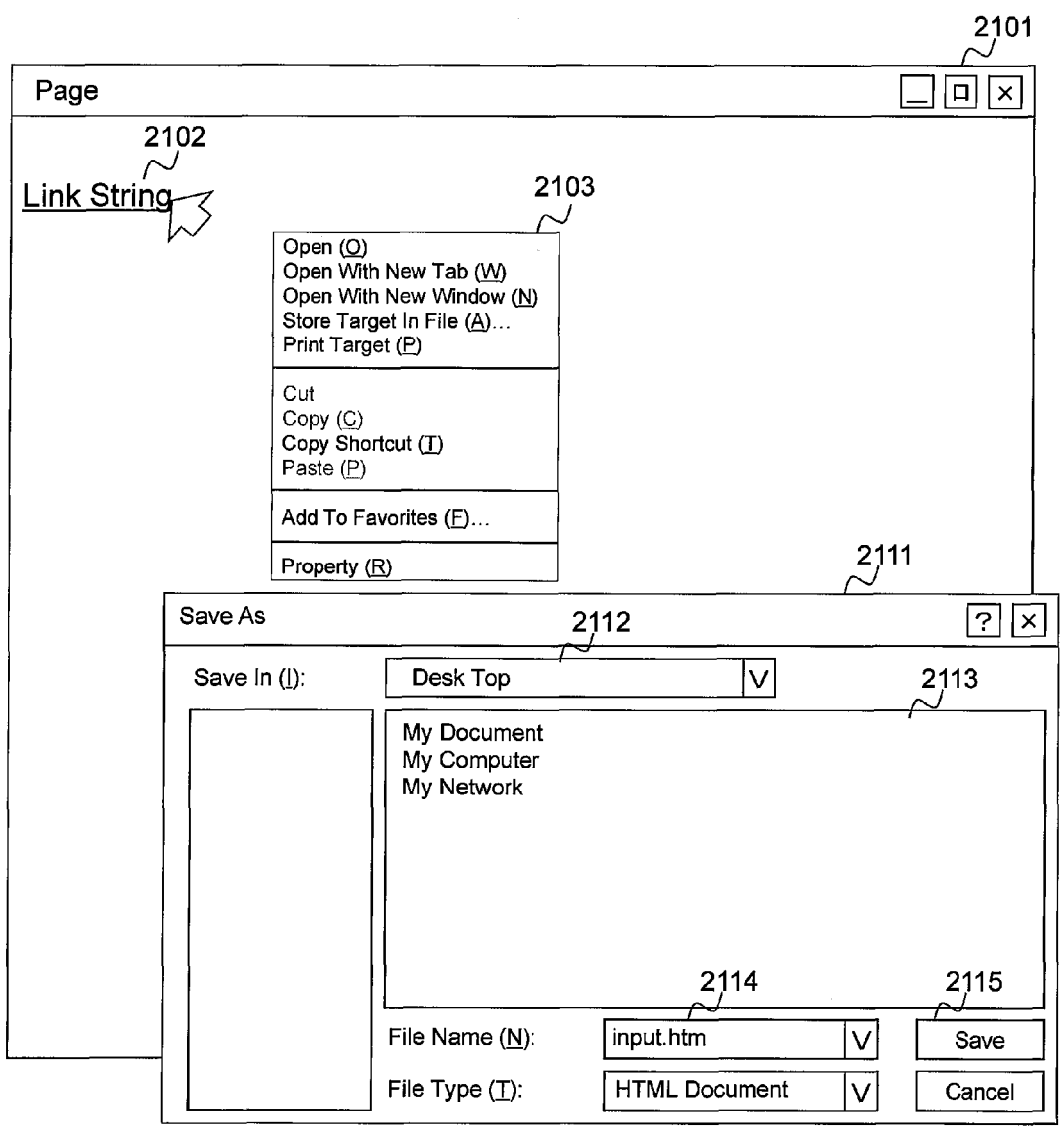
FIG. 21 shows an example of the Web browser screen when inputting a file.

FIG. 21 shows an example of the Web browser screen when the user inputs a file by operating the application with the client PC 121.

The Web browser screen (screen displayed on the display device 211) 2101 includes an area referred to as a so-called link (for example, an area in which screen transition occurs when clicked with a pointing device such as a mouse (input device coupled to the client PC 121)). According to FIG. 21, a link string 2102 is displayed in that area.

When the mouse cursor is placed on the link string 2102 and the left button is clicked, a transition is made to the following screen (also referred to as a page), or a download dialog 2111 is displayed. The download dialog 2111 is a dialog for downloading the target in the clicked link.

Moreover, when the mouse cursor is placed on the link string 2102 and the right button is clicked, a pop-up window referred to as a so-called context menu 2103 is displayed. The context menu 2103 displayed here includes an item of "Save target in file (A) . . . ", and by left clicking this item, the download dialog 2111 for downloading this target is displayed.

The download dialog 2111 includes a field 2112 showing the location where the downloaded file is to be stored, a field 2113 displaying the options of the folder to which the file is to be stored, and a field 2114 showing the name of the file to be stored. The name of the file to be stored can be rewritten. The user operates the fields 2112 and 2113 and selects the folder for storing the file, and changes the stored file name with the field 2114 as needed, and, by clicking the save button 2115, the user is able to download the file using the Web browser and save the file in an arbitrary folder.

Figure 3:
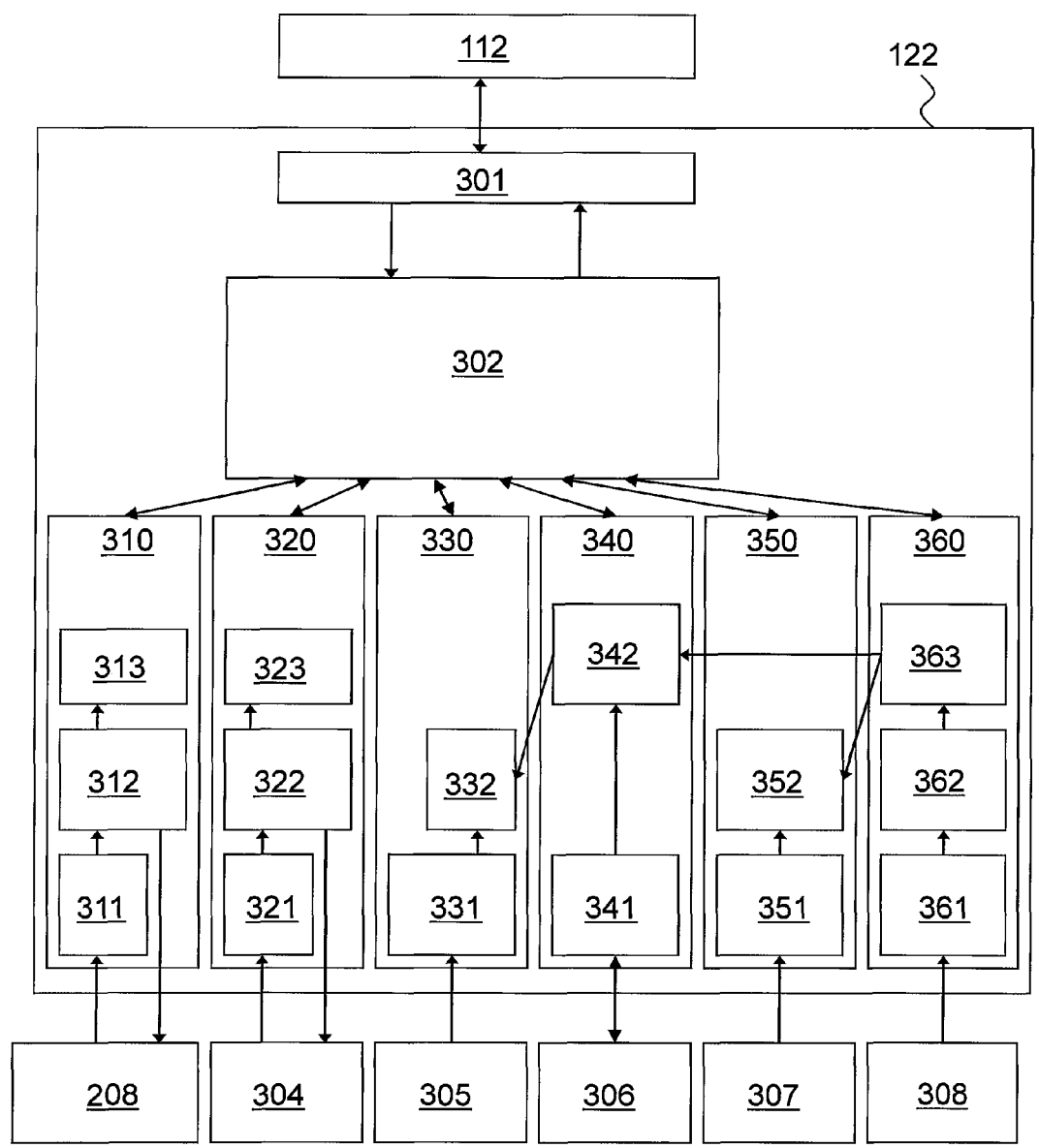
FIG. 3 is a functional block diagram of the client PC 121 according to the first embodiment.

FIG. 3 is a functional block diagram of the client PC 121 according to the first embodiment.

The agent 122 comprises a manager communication functional module 301 that is in charge of the communication with the manager 112, and a monitoring module control function 302 for governing a plurality of monitoring modules for monitoring the user operation to the client PC 121.

As the monitoring modules, for example, there are a process monitoring module 310, a printer monitoring module 320, a browser monitoring module 330, a dialog operation monitoring module 340, a file operation monitoring module 350, and a TCP communication monitoring module 360. The details are as follows.

The process monitoring module 310 monitors the operational status of the application program 208 running on the client PC 121.

The printer monitoring module 320 monitors the output operation to the printer 304 including the network printer 123.

The browser monitoring module 330 monitors the user operation to the Web browser 305.

The dialog operation monitoring module 340 monitors the user operation to the various dialogs 306 displayed on the screen of the client PC 121 (for example, the operation for selecting and downloading or uploading a file).

The file operation monitoring module 350 monitors the operation to the application program 208 (for example, the clicking of a button or the drag & drop of an object displayed in the application window).

The TCP communication monitoring module 360 monitors the condition of an application program, such as a mailer for transmitting and receiving data via a network, sending or receiving a data stream being using a socket 308 or the like of a TCP/IP (Transmission Control Protocol/Internet Protocol) based on the user's operation.

Moreover, the agent 122 uses a system policy 391 as a configuration file for controlling the operation of the various modules, and a system policy 392 as a configuration file for performing control related particularly to security. Further, the agent 122 also uses an input source DB 393 to which is registered a combination of information relating to the input file and an identifier of the input source. The configuration of the input source DB 393 and the roles of the system policy 391 and the security policy 392 are described later.

The process monitoring module 310 comprises a start-up detection function 311, an inhibition function 312, and a user notification function 313.

The start-up detection function 311 detects that the start-up of the application program 208 was requested using the client PC 121. The inhibition function 312 inhibits the start-up if the application program 208 to be started conflicts with the security policy 392. The user notification function 313 notifies the user that the start-up was inhibited.

The printer monitoring module 320 comprises a print detection function 321, an inhibition function 322, and a user notification function 323.

The print detection function 321 detects that the user requested printing using the printer 304 using the client PC 121. The inhibition function 322 inhibits the printing if the file containing the information to be printed conflicts with the security policy 392. The user notification function 323 notifies the user that the printing was inhibited.

The browser monitoring module 330 comprises an access detection function 331, and a detected content retention function 332.

The access detection function 331 detects that the client PC 121 accessed the Web server 116 or 131. The detected content retention function 332 temporarily retains the URL (Uniform Resource Name) of the Web server 116 or 131 of the access destination, the received HTML (Hypertext Markup Language) file, and the like.

The dialog operation monitoring module 340 comprises a dialog detection function 341, and an input source information assignment/verification function 342.

The dialog detection function 341 detects that a dialog (for example, a file selection dialog or a print dialog) has been displayed as a result of the user operating the application program 208 of the client PC 121. The input source information assignment/verification function 342 assigns the identifying information of the input source of the file to that file that was operated using the dialog 306, and verifies the assigned input source identifier.

Here, as an operation of displaying a file selection dialog, for example, there is the operation of downloading or uploading a file using the Web browser, the operation of using a mailer and saving an attachment from an incoming email, or the operation of attaching a file to an outgoing email. Moreover, as an operation of displaying a print dialog, for example, there is the operation of selecting the print function with a word processor or spread sheet software.

The file operation monitoring module 350 comprises an operation detection function 351, and an input source information assignment/verification function 352.

The operation detection function 351 detects that the user performed an operation on a window of various applications of the client PC 121 (clicking of the mouse button or drag & drop of an object displayed in the window). The input source information assignment/verification function 352 assigns the information concerning the input source of the file to that file that was operated using the mouse, and verifies the assigned information concerning the input source.

Here, as a file operation based on the clicking of the mouse button, for example, there is the operation or right clicking the link displayed on the screen of the Web browser and saving the object indicated by the link as a file in the displayed menu, or the operation of dragging & dropping the file attached to the incoming message screen of the mailer and copying it to the desktop.

The TCP communication monitoring module 360 comprises a socket reception detection function 361, a protocol analyzing function 362, and a registration/notification function 363.

The socket reception detection function 361 detects that a file was sent or received via a network as a result of the user operating the network application of the client PC 121. The protocol analyzing function 362 analyzes the file that was sent or received via the socket 308. The registration/notification function 363 registers the input source identifying information of a file in the input source DB 393 when that file is downloaded to the client PC 121 via the socket 308, and notifies the input source identifying information of that file to the input source information assignment/verification module 342 or 352.

Each of the foregoing monitoring modules comprises, in accordance with the detected item, a function for communicating with the other monitoring modules or the input source DB 393, a function for sending an alert to the manager 112 via the monitoring module control function 302 and the manager communication function 301, and a function for creating an alert or a log (a log represented the detected item).

Note that, in the ensuing explanation, the term "information" is used based on expressions such as "information concerning the file," but such information may also be expressed in a format other than a data structure such as a table. Thus, in order to show that it does not depend on a data structure, expressions such as "information concerning the file" is sometimes simply referred to as "information." Similarly, since the explanations based on the term "DB" do not necessarily require a data structure as a database, explanations based on the term "DB" is also sometimes simply referred to as "information."

Moreover, upon explaining each piece of information, expressions such as "identifying information," "identifier," "forename," "name," and "ID" are used, but these expressions may be mutually substituted.

Moreover, it is not essential to realize this embodiment using a thread mechanism, and any mechanism may be used so as long as it can be executed with a mechanism that manages the performance of programs to be provided by the OS such as a micro thread or process mechanism.

Note that the management server 111 comprises an input/output device. As an example of an input/output device, a display and a keyboard and a pointer device may be considered, but other devices may also be used. In addition, in substitute for the input/output device, a serial interface or an Ethernet interface may be used as the input/output device and coupled to a display computer including a display or a keyboard or a pointer device on its interface. By displaying the information to be displayed on the display computer and accepting the input thereof, this may be substituted for the input and display using an input/output device.

Several examples of the processing that is performed when the user performs the operation of inputting a file in the client PC 121 are now explained with reference to FIG. 4 to FIG. 7.

Figure 4:
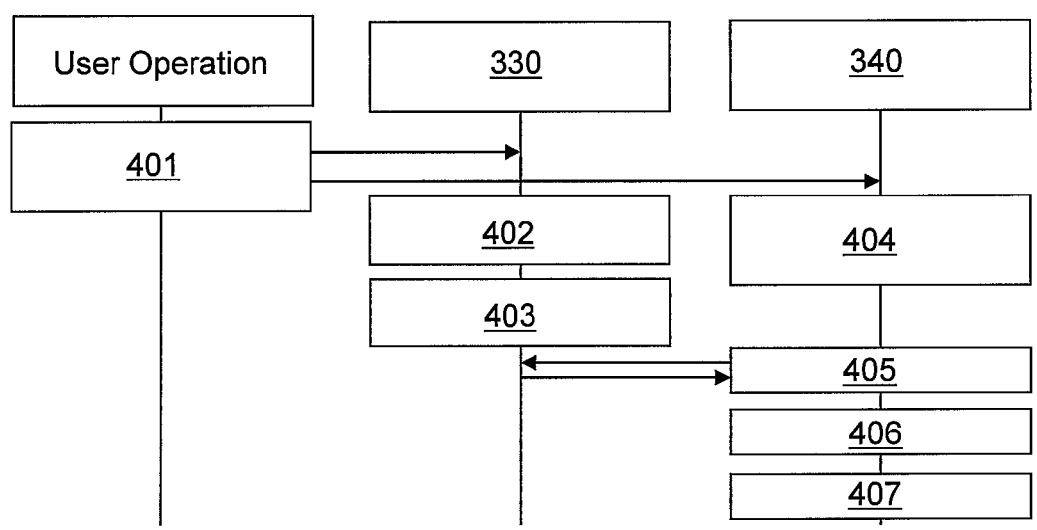
FIG. 4 shows the flow of the processing to be executed by the browser monitoring module 330 and the dialog operation monitoring module 340 when the user downloads a file with the Web browser.

FIG. 4 shows the flow of the processing to be executed by the browser monitoring module 330 and the dialog operation monitoring module 340 when the user downloads a file with the Web browser. Note that in FIG. 4, for the sake of convenience, the file to be input is indicated as "file F4."

When the user left clicks the link displayed on the Web browser (step 401), a user operation event of page transition arises in the Web browser. The browser monitoring module 330 detects the user operation event of page transition (step 402). The browser monitoring module 330 saves the URL after the transition (that is, the URL of the object of the clicked link), and waits for an information provision request from the dialog operation monitoring module 340 (step 403).

Meanwhile, if the object of the link is information of a type that cannot be inline-displayed with the Web browser based on the left click operation, then a file download dialog is displayed. Here, the dialog operation monitoring module 340 detects a dialog operation event when the file download dialog is displayed (step 404). The dialog operation monitoring module 340 requests the URL information after the transition (information showing the URL after the transition) to the browser monitoring module 330, and subsequently inputs the URL information after the transition from the browser monitoring module 330 (step 405).

When the save button is clicked in the file download dialog, the dialog operation monitoring module 340 inputs the save destination file name from the information displayed on the dialog (information based on the processing of the OS 207). The dialog operation monitoring module 340 acquires the full path (path name of the file F4) as the save destination information of the file F4 (step 406). Moreover, the dialog operation monitoring module 340 assigns an identifier showing the input source of the file F4 to the file F4 with the file F4 as the monitoring target if the server that is identified from the URL information after the transition input at step 405 is the inside-organization Web server 116 (step 407). Further, if the server that is identified from the URL information after the transition of the file F4 is the outside-organization Web server 131, the dialog operation monitoring module 340 performs (a) or (b) below:

(a) assigns an identifier showing the input source of the file F4 to the file F4 since the file F4 is not a monitoring target, or (b) does not assign an identifier showing the input source of the file F4 to the file F4.

One reason that the file F4 is a monitoring target when the input source (download source) of the file F4 is the inside-organization Web server 116 and the file F4 is not a monitoring target when the input source of the file F4 is the outside-organization Web server 131 is as follows. Specifically, if the input source of the file F4 is inside-organization, the file F4 is confidential and, therefore, it is considered that the outside-organization output of the file F4 should be detected. Meanwhile, if the input source of the file F4 is outside-organization, it is considered that there will be no particular program to the organization even if the file F4 is outside-organizationly output once again.

This identifier can be realized by using an "alternate stream" if the local file system 209 that is used by the client PC 121 is, for example, Microsoft's NTFS (NT File System).

Figure 5:
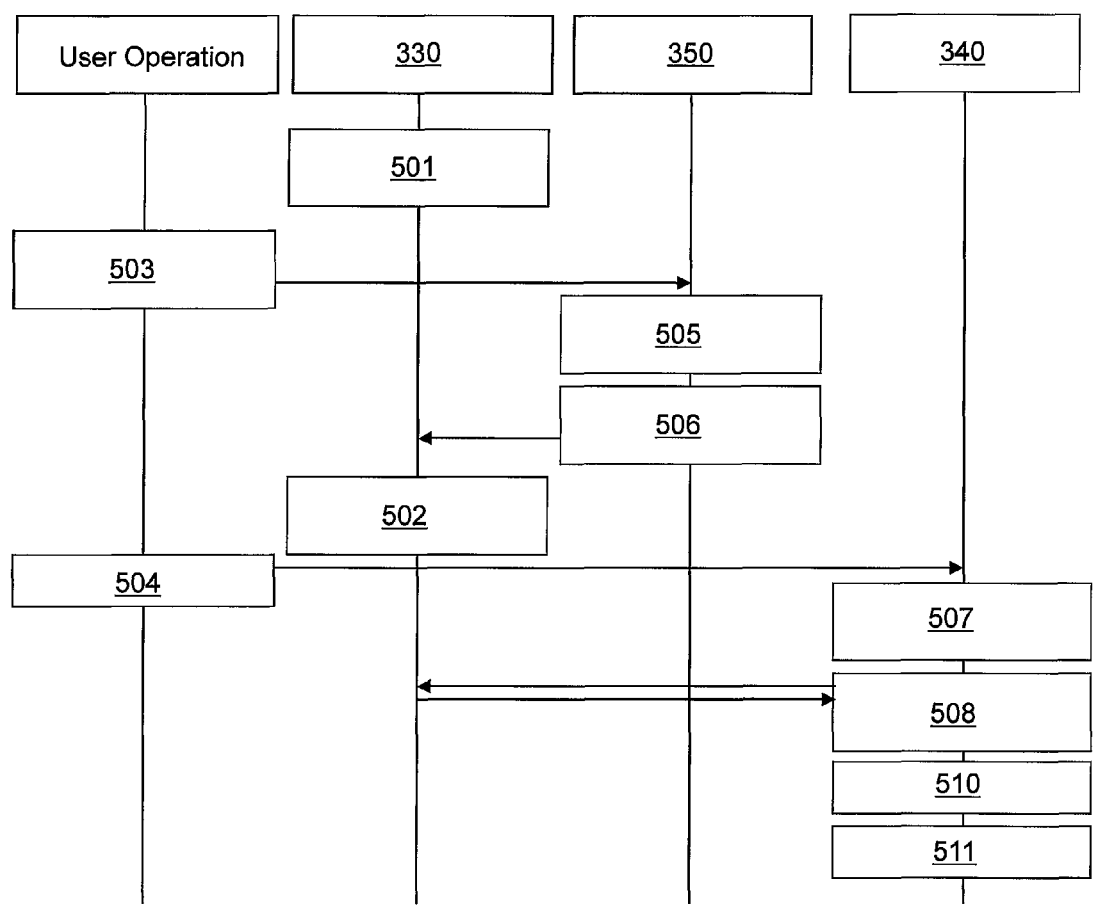
FIG. 5 shows the flow of the processing to be executed by the browser monitoring module 330, the dialog operation monitoring module 340, and the file operation monitoring module 350 when the user downloads a file with the Web browser.

FIG. 5 shows the flow of the processing to be executed by the browser monitoring module 330, the dialog operation monitoring module 340, and the file operation monitoring module 350 when the user downloads a file with the Web browser. Note that in FIG. 5, for the sake of convenience, the file to be input is indicated as "file F5."

When the user displays a page with the Web browser, the browser monitoring module 330 detects the user operation event of page transition (step 501). Here, the Web browser retains the URL information after the transition and the page source, and may deliver the same according to the request of the browser monitoring module 330. In this state, if the user right clicks the link displayed on the Web browser (step 503), a mouse operation event occurs and the file operation monitoring module 350 detects such event (step 505).

The file operation monitoring module 350 that detected the occurrence of the mouse operation event saves information concerning the location where the mouse operation event occurred on the Web browser as object-related information, and sends that information to the browser monitoring module 330 (step 506).

The browser monitoring module 330 saves the URL information after the transition and the page source each time a page is displayed on the Web browser (step 502).

When an item related to "Save file" is selected from the displayed context menu based on the user's right click (step 504), the file save dialog is displayed.

When the dialog operation monitoring module 340 detects the foregoing dialog display event (step 507), it acquires the URL information of the displayed page and the page source (page data) from the browser monitoring module 330 (step 508). In addition, the dialog operation monitoring module 340 acquires a file path for saving (downloading) the file F5 (step 510). If the server that is identified from the URL information regarding the file F5 is the inside-organization Web server 116, the dialog operation monitoring module 340 assigns an input source identifier of the file F5 to the file F5 since the file F5 is a monitoring target (step 511). Moreover, if the server that is identified from the URL information regarding the file F5 is the outside-organization Web server 131, the dialog operation monitoring module 340 performs (a) or (b) below:
(a) assigns an input source identifier of the file F5 to the file F5 since the file F5 is not a monitoring target, or
(b) does not assign an input source identifier of the file F5 to the file F5.
Note that the input source identifier that was assigned to the file F5 may be included, for example, in the metadata of the file F5.

Figure 6:
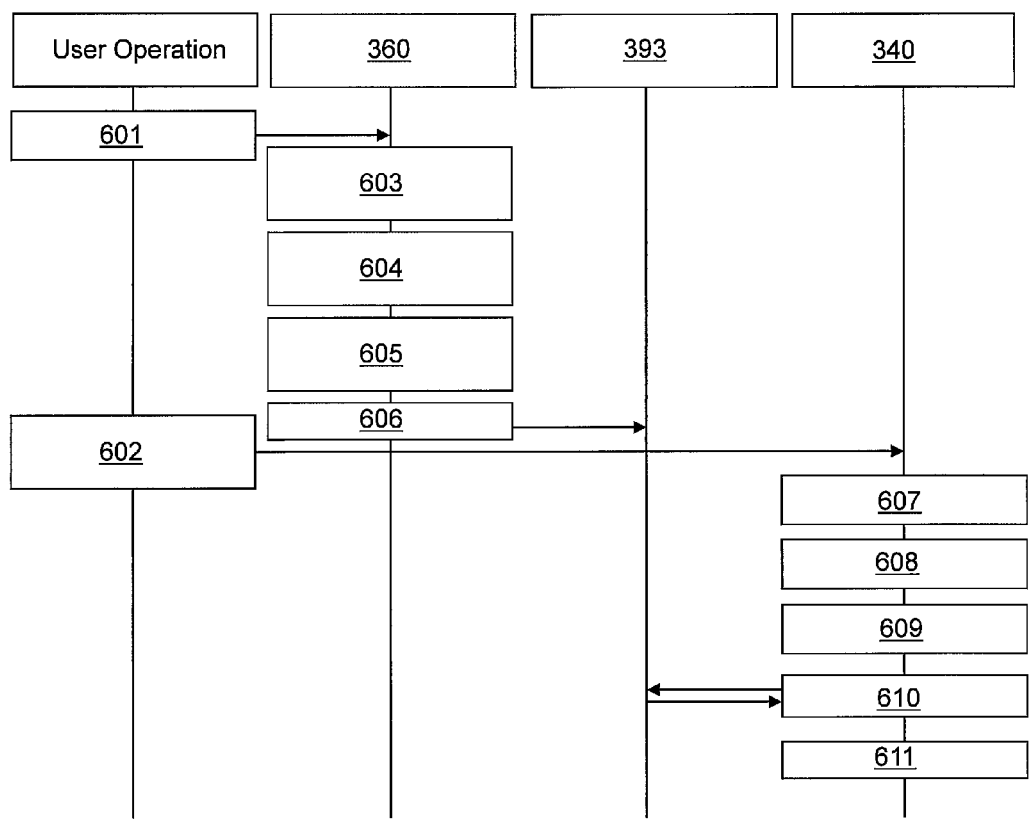
FIG. 6 shows the flow of the processing to be executed by the TCP communication monitoring module 360 and the dialog operation monitoring module 340 when the user saves a file attached to an email in the local file system 209 with a mailer.

FIG. 6 shows the flow of the processing to be executed by the TCP communication monitoring module 360 and the dialog operation monitoring module 340 when the user saves a file attached to an email in the local file system 209 with a mailer. Note that in FIG. 6, for the sake of convenience, the file to be input is indicated as "file F6." In addition, the term "email" is simply referred to as "mail."

When the user performs a message receiving operation such as starting the mailer or executing a mail display operation (step 601), the mailer receives (downloads) the mail (message) from the email server 114 according to a protocol such as POP (Post Office Protocol) 3 or IMAP (Internet Message Access Protocol) 4. Consequently, the TCP communication monitoring module 360 monitoring the socket in the network driver or the TCP/IP protocol stack performs the analyzing processing of the received mail (step 603), and acquires the sender name and the attachment name from the incoming email (step 604).

Moreover, the TCP communication monitoring module 360 decodes the attachment that was encoded with Base 64 or the like and calculates the hash value (step 605).

The attachment name, the hash value, and the sender name of the attachment acquired at step 604 and step 605 are registered in the input source DB 393 (606). The input source DB 393 comprises, as shown in FIG. 13A, the following information for each file:
a file name 1301 representing the name of the file,
a sender name 1302 representing the name of the sender of the mail to which that file was attached, and
a hash value 1303 of the file (or the file body other than the metadata of the file).

Note that the information shown with a reference 1311 in FIG. 13B is an example of the input source identifier that is assigned to the file.

There are cases where the user attempts to perform an operation for saving the attachment F6 in the local file system 209 while that user is perusing the mail body using the mailer (this operation is sometimes executed after the lapse of a considerable period of time and not immediately after the mail is downloaded).

When the user uses the file save dialog and performs an operation for saving the attachment F6 (step 602), the dialog operation monitoring module 340 detects this dialog display event (step 607), inputs the file name from the information displayed on the dialog (for example, information designated by the user) (step 608), and inputs the full path of the save destination of the file F6 (step 609). In addition, the dialog operation monitoring module 340 searches the input source DB 393 with the file name displayed on the foregoing dialog as the key, and acquires the sender name and the hash value corresponding to that file name from the input source DB 393 (step 610).

Here, if the attachment name is a general name; for instance, "specification.doc" (refer to FIG. 13A), there may be cases where a plurality of records regarding the file with the file name of "specification.doc" are registered in the input source DB 393. In the foregoing case, the dialog operation monitoring module 340 may calculate the hash value of the file F6 of the file name that was input at step 608, and search the input source DB 393 with that hash value as the key in substitute for or in addition to the file name in order to acquire the sender name of the mail with the attachment F6 to be saved in the local file system 209. The calculation of the hash value of the file may always be performed at step 610, or performed only when the file name acquired at step 608 satisfies specific conditions (for example, when the file name is a general name).

At step 610, the hash value of the file F6 is calculated. The dialog operation monitoring module 340 compares the calculated first hash value, and the second hash value 1303 that was acquired from the input source DB 393. If the first and second hash values are mutually equal and the sender of the mail including the file F6 is a different inside-organization user (user of the same organization as the organization to which the client PC 121 (user) that received the mail belongs), the dialog operation monitoring module 340 assigns in input source identifier of the file F6 to the file F6 since the file F6 is a monitoring target (step 611). Meanwhile, if the first and second hash values are mutually equal and the sender of the mail including the file F6 is a different outside-organization user (user of a different organization as the organization to which the client PC 121 (user) that received the mail belongs), the dialog operation monitoring module 340 performs (a) or (b) below (step 611):

(a) assigns an input source identifier of the file F6 to the file F6 since the file F6 is not a monitoring target, or
(b) does not assign an input source identifier of the file F6 to the file F6 (step 611).

Note that if the first and second hash values are not mutually equal, the operation monitoring module 340 assigns the input source identifier of the file F6 to the file F6 since the file F6 was input to the client PC 121 based on a method other than mail.

Figure 7:
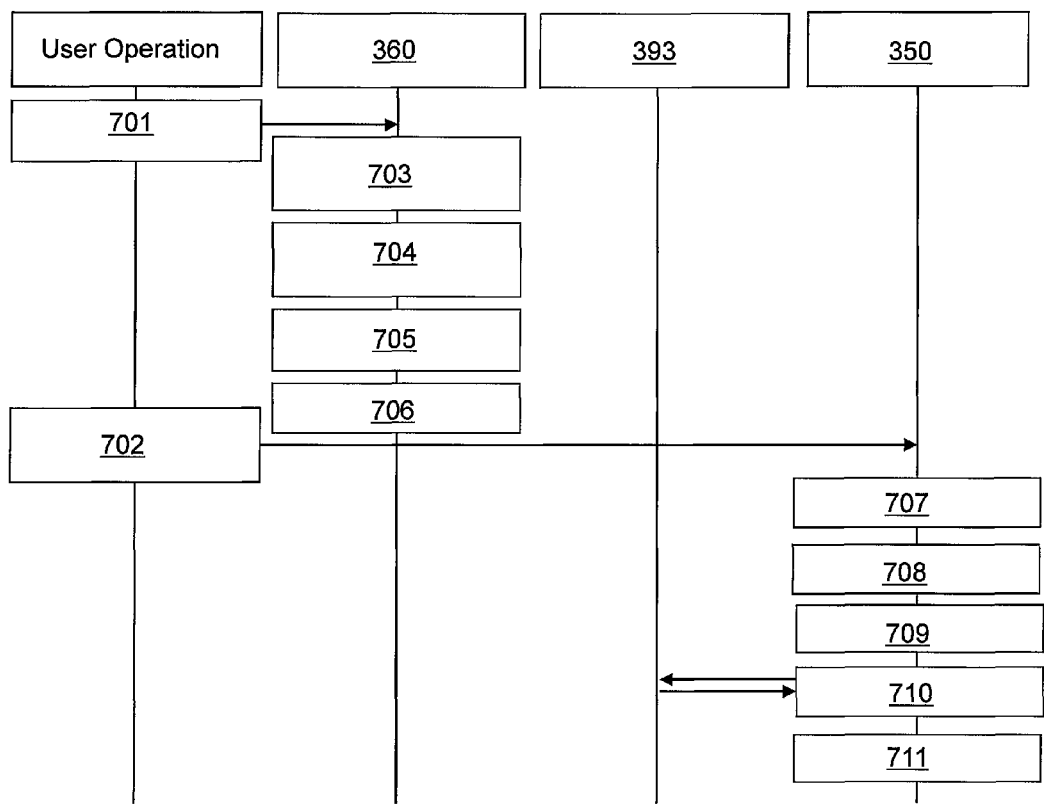
FIG. 7 shows the flow of the processing to be executed by the TCP communication monitoring module 360 and the file operation monitoring module 350 when the user saves a file attached to an email in the local file system 209 with a mailer.

FIG. 7 shows the flow of the processing to be executed by the TCP communication monitoring module 360 and the file operation monitoring module 350 when the user saves a file attached to an email in the local file system 209 with a mailer. Note that in FIG. 7, for the sake of convenience, the file to be input is indicated as "file F7."

The processing from step 701 to step 706 is the same as step 601 to step 606 in FIG. 6. In FIG. 7, the operation of saving the attachment in the local file system 209 is different in comparison to FIG. 6.

Specifically, in FIG. 7, the user drags & drops the icon showing the attachment F7 displayed in the mailer screen to the desktop or file explorer as the operation of saving the attachment in the local file system 209 while perusing the mail body with the mailer.

In the case of this kind of operation, the file operation monitoring module 350 detects a drag & drop event using a mouse from the mailer screen (step 707). Moreover, the file operation monitoring module 350 monitors a file creation event in the local file system 209. The file operation monitoring module 350 acquires the name and full path of the file F7 that was created in the local file system 209 in response to the drag & drop operation using a mouse (steps 708 and 709), and acquires the sender name of the file F7 from the input source DB 393 with the file name and the hash value of the file as the keys (710).

Several examples of the processing when the user outputs a file to the client PC are now explained with reference to FIG. 8 to FIG. 11.

Figure 8:
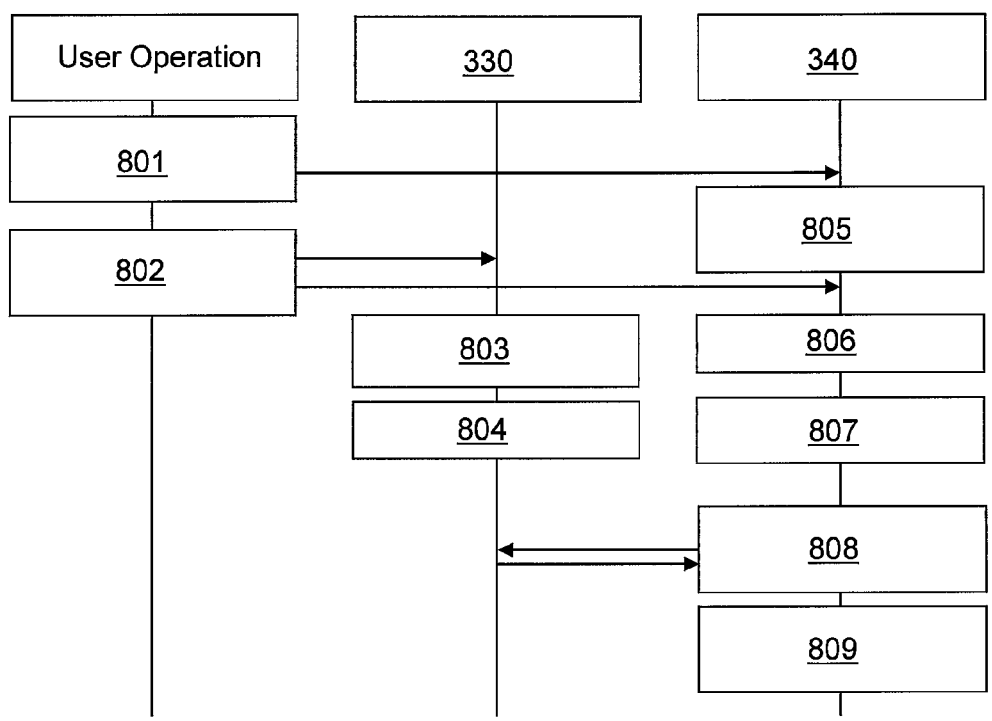
FIG. 8 shows the flow of the processing to be executed by the browser monitoring module 330 and the dialog operation monitoring module 340 when the user uploads a file with the Web browser.

FIG. 8 shows the flow of the processing to be executed by the browser monitoring module 330 and the dialog operation monitoring module 340 when the user uploads a file with the Web browser. Note that in FIG. 8, for the sake of convenience, the file to be output is indicated as "file F8."

The user clicks a button for adding a file to be uploaded on the form screen to be used for the file upload displayed on the Web browser (step 801). In the foregoing case, the Web browser displays a file selection dialog. The dialog operation monitoring module 340 detects the event displayed on the file selection dialog, acquires the name of the selected file, and starts monitoring the opening of the file (step 805).

The user uses the file selection dialog and selects the file F8, and clicks the file registration button in the foregoing form screen (step 802). Here, the form screen is submitted to the Web server 116 or 131 and the screen displayed on the Web browser is subject to transition.

The browser monitoring module 330 detects the page transition event that consequently occurs (step 803), and saves the URL information after the transition (step 804).

Here, if the file upload is submitted to the Web server 116 or 131, the dialog operation monitoring module 340 detects the opening of the file F8 (step 806), and acquires the file path of the file F8 from the OS 207 (step 807).

In addition, the dialog operation monitoring module 340 acquires the URL information after the page transition from the browser monitoring module 330. The dialog operation monitoring module 340 acquires the input source identifier of the file F8 if the Web browser of the upload destination of the file F8 is the outside-organization Web server 131 since the output destination of the file F8 is a verification target. Subsequently, the dialog operation monitoring module 340 performs alert processing based on the security policy (refer to FIG. 2) 392 corresponding to the application related to the upload of the file F8 (step 809). For example, if the file F8 is an inside-organization input file (for example, a file copied from the inside-organization file server 115, a file downloaded from the inside-organization Web server 116, or a file attached to a mail that was received from an inside-organization client PC 121), the alert processing may be performed.

Alert processing is processing of creating an alert (more specifically, information representing an alert) which signifies that the conditions of fraudulent manipulation have been satisfied as a result of the file that was output (exported) from the client PC 121 is a file that was input (imported) based on fraudulent manipulation, and sending the created alert to the management server 111. The alert processing may be performed when all of the following conditions (a) to (c) are satisfied. Here, information representing the conditions (a) to (c) may be described in the security policy 392:

(a) the output destination (for example, the Web server of the upload destination of the file F8) of the file to be output from the client PC 121 is an outside-organization Web server 131 (that is, a verification target that is different from the management target of the management server 111),
(b) the file to be output from the client PC 121 (for example, a file that was processed with the client PC 121) is an inside-organization input file (for example, a file that was copied from an inside-organization file server 115, a file that was downloaded from an inside-organization Web server 116, or a file that was attached to a mail received from an inside-organization client PC 121), and
(c) the specified input source based on the input source identifier of the file is a management target of the management server 111.

In the foregoing case, the manager 112 in the management server 111 may receive an alert from the client PC 121, and store the alert in a storage resource (the disk 113, for example). The manager 112 may output (display, for example) the alert since a fraudulent manipulation with a high risk of an information leakage incident has been detected. The administrator may take measures for inhibiting the information leakage based on the alert that was collected in the management server 111.

Various types of security processing may be performed in substitute for or in addition to the alert processing (for example, processing for discontinuing (prohibiting) the upload of the file F8 and/or processing that is defined in the security policy 392 corresponding to the application related to the upload of the file F8). In addition, if the relationship of the input source specified from the input source identifier of the file F8 and the upload destination of the file F8 satisfies the conditions represented by the security policy 392 corresponding to the application related to the upload of the file F8, the dialog operation monitoring module 809 may perform the security processing (alert processing, for example).

Figure 9:
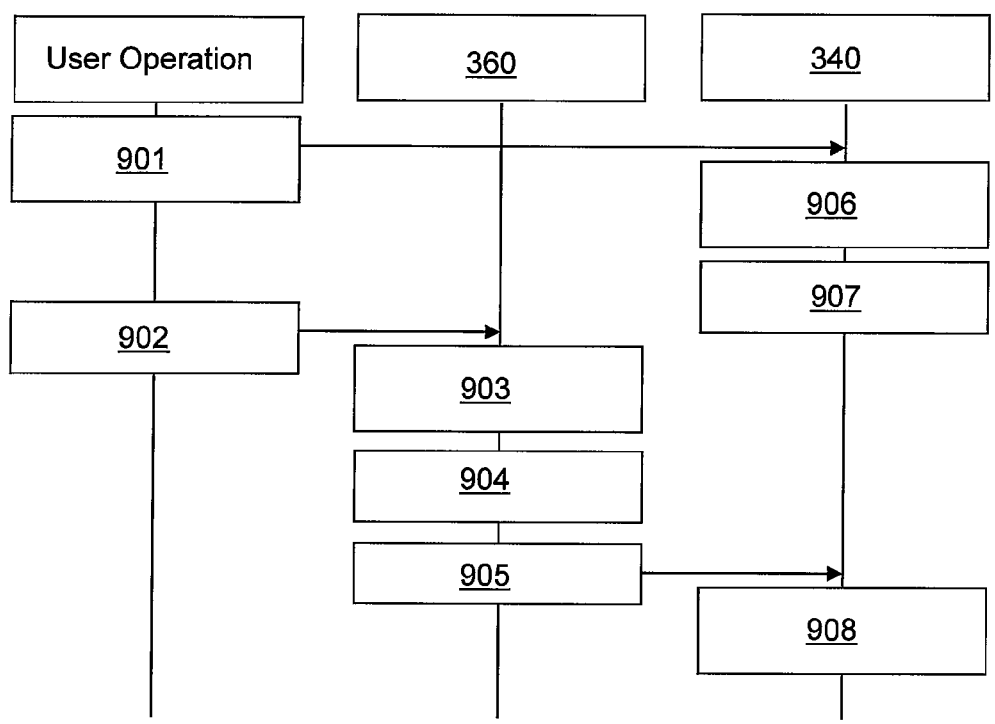
FIG. 9 shows the flow of the processing to be executed by the TCP communication monitoring module 360 and the dialog operation monitoring module 340 when the user sends an email with an attachment using a mailer.

FIG. 9 shows the flow of the processing to be executed by the TCP communication monitoring module 360 and the dialog operation monitoring module 340 when the user sends an email with an attachment using a mailer. Note that in FIG. 9, for the sake of convenience, the file to be output is indicated as "file F9."

The user performs an operation for attaching the file F9 using the file selection dialog while creating an outgoing email with the mailer (step 901). Here, the dialog operation monitoring module 340 detects a display event of a file selection dialog (step 906). Subsequently, the dialog operation monitoring module 340 acquires the name and full path of the selected file F9 (step 907), and waits for the mail to be sent. Note that, at step 901, the dialog operation monitoring module 340 calculates the hash value (first hash value) of the attachment F9. The dialog operation monitoring module 340 may register a set of the first hash value, the file name of the file F9 and the destination information (for example, email address of the destination) in an output destination management information not shown (for example, an output destination DB (not shown)).

When the user thereafter implements a mail sending operation with the mailer (step 902), the TCP communication monitoring module 360 analyzes the data to be transmitted with the SMTP (Simple Mail Transfer Protocol) protocol (step 903). At step 903, for example, the TCP communication monitoring module 360 calculates the hash value of the attachment F9 of that mail. Subsequently, the TCP communication monitoring module 360 compares the first hash value calculated at step 901 and the second hash value calculated at step 903 and acquires the destination information and the attachment name (step 904). The destination information and the file name acquired at step 904 are, for example, the destination information and the file name that are associated with the first hash value that coincides with the second hash value, and is information that is acquired from the foregoing output destination management information. Note that, if a file is not attached to the outgoing email, steps 903 and 904 may be omitted.

If the file F9 is attached to an outgoing email and the mail destination is outside-organization, the TCP communication monitoring module 360 notifies the attribute information concerning the file F9 (for example, the fact that the mail will be sent to an outside-organization address) to the dialog operation monitoring module 340 in standby (step 905).

The dialog operation monitoring module 340 acquires the input source identifier of the file F9 attached to the outgoing email. The dialog operation monitoring module 340 thereafter performs security processing based on the security policy (refer to FIG. 2) 392 corresponding to the application related to the sending of the mail to which the file F9 is attached (step 908). For example, if the file F9 is an inside-organization input file (for example, a file attached to a mail received from an inside-organization client PC 121), the alert processing may be performed.

Figure 10:
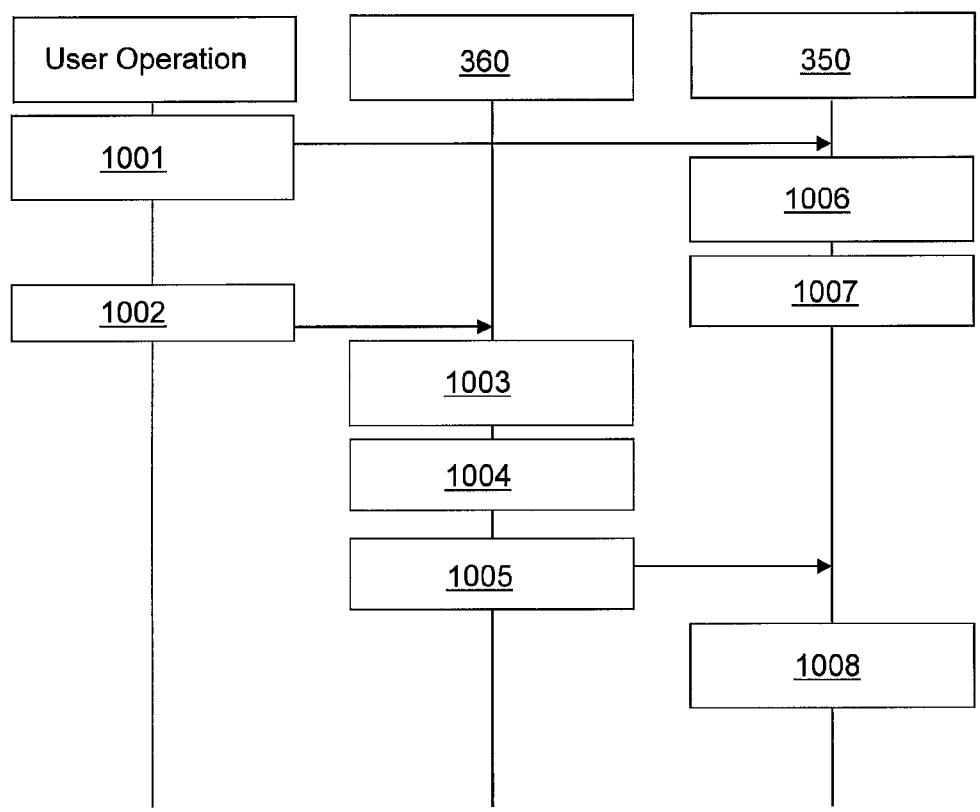
FIG. 10 shows the flow of the processing to be executed by the TCP communication monitoring module 360 and the file operation monitoring module 350 when the user sends an email with an attachment using a mailer.

FIG. 10 shows the flow of the processing to be executed by the TCP communication monitoring module 360 and the file operation monitoring module 350 when the user sends an email with an attachment using a mailer. Note that in FIG. 10, for the sake of convenience, the file to be output is indicated as "file F10."

The user performs an operation for attaching the file F10 based on drag & drop while creating an outgoing email with a mailer (step 1001). The file operation monitoring module 350 detects that the file has been dragged & dropped to the window of the mailer based on a file explorer or the like (step 1006). The file operation monitoring module 350 acquires the name and the full path of the file of the selected file F10 (step 1007), and waits until the mail is sent. At step 1001, as with step 901, the first hash value of the file F10 is calculated.

When the user thereafter performs a mail sending operation with the mailer (step 1002), the TCP communication monitoring module 360 analyzes the data to be transmitted with the SMTP protocol (step 1003), and acquires the destination information and the attachment name (step 1004). At step 1003, the communication monitoring module 360 calculates the second hash value of the attachment F10. Consequently, the destination information and the attachment name corresponding to the first hash value coinciding with the second hash value are acquired.

If the file F10 is attached to an outgoing email and the mail destination is outside-organization, the TCP communication monitoring module 360 notifies the attribute information concerning the file F10 (for example, the fact that the mail will be sent to an outside-organization address) to the dialog operation monitoring module 340 in standby (step 1005).

The file operation monitoring module 350 acquires the input source identifier of the file F10 attached to the outgoing email if the first and second hash values mutually coincide. The file operation monitoring module 350 thereafter performs security processing based on the security policy (refer to FIG. 2) corresponding to the application related to the sending of the mail to which the file F10 is attached (step 1008). For example, if the file F10 is an inside-organization input file, the file operation monitoring module 350 may perform alert processing.

Figure 11:
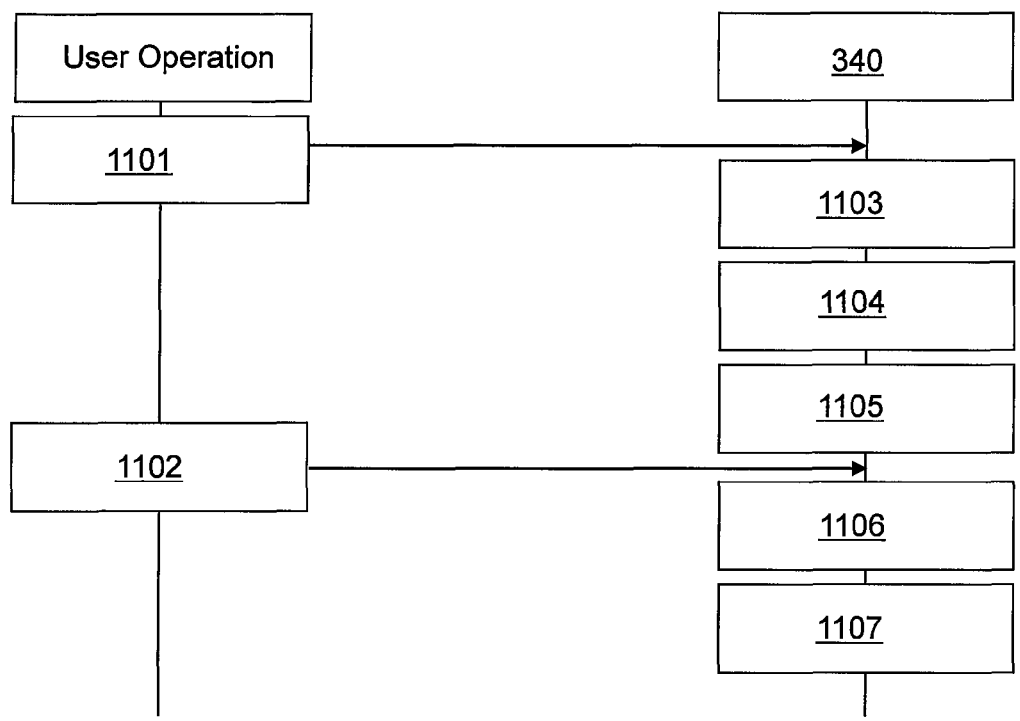
FIG. 11 shows the flow of the processing to be executed by the dialog operation monitoring module 340 when the user performs print operation.

FIG. 11 shows the flow of the processing to be executed by the dialog operation monitoring module 340 when the user performs print operation. Note that in FIG. 11, for the sake of convenience, the file to be output is indicated as "file F11."

The user performs a print operation to the application program (for example, a word processor) (step 1101). Here, the dialog operation monitoring module 340 detects a display event of a print dialog (step 1103), and acquires a window title of the application program to implement the printing (step 1104). The application program is thereafter opened, and the dialog operation monitoring module 340 acquires the full path of the file F11 to be printed (step 1105).

When the user thereafter clicks the print button in the print dialog (step 1102), the dialog operation monitoring module 340 detects that the dialog has been closed (step 1106). The dialog operation monitoring module 340 acquires the input source identifying information of the sent file F11. Subsequently, the dialog operation monitoring module 340 performs security processing based on the security policy (refer to FIG. 2) corresponding to the application related to the printing of information contained in the file F11 (step 1107). For example, if the file F11 is an inside-organization input file, the dialog operation monitoring module 340 performs alert processing.

Figure 12A:
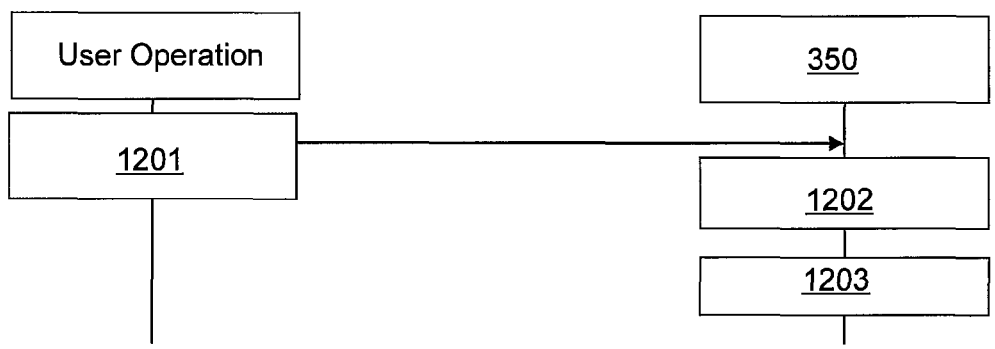
FIG. 12A shows the flow of the processing to be executed by the file operation monitoring module 350 when the user copies information in the file server 115 to the local file system 209 using a file explorer.

FIG. 12A shows the flow of the processing to be executed by the file operation monitoring module 350 when the user copies information in the file server 115 to the local file system 209 using a file explorer. Note that in FIG. 12A, for the sake of convenience, the file to be input is indicated as "file F12A."

When the user uses a file explorer and copies a file or performs a migration operation (step 1201), the file operation monitoring module 350 performs processing for specifying the copy source and copy destination of the file (step 1202). The file operation monitoring module 350 thereafter assigns an input source identifier to the file F12A to be operated if the copy source is the file server 115 and the copy destination is the client PC 121 (step 1203).

Figure 12B:
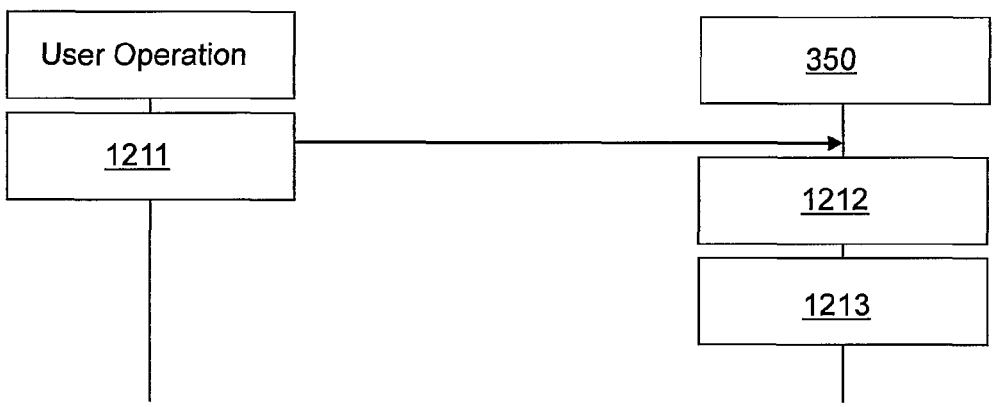
FIG. 12B shows the flow of the processing to be executed by the file operation monitoring module 350 when the user copies a file to a removable media using a file explorer.

FIG. 12B shows the flow of the processing to be executed by the file operation monitoring module 350 when the user copies a file to a removable media using a file explorer. Note that in FIG. 12B, for the sake of convenience, the file to be output is indicated as "file F12B."

When the user uses a file explorer and copies a file or performs a migration operation (step 1211), the file operation monitoring module 350 performs processing for specifying the copy source and copy destination of the file (step 1212). Subsequently, the file operation monitoring module 350 acquires the input source identifier of the file F12B to be operated if the copy source is the local file system 209 of the client PC 121 and the copy destination is the removable media 125. The file operation monitoring module 350 thereafter performs security processing based on the security policy (refer to FIG. 2) corresponding to the application relating to the copy or migration of the file F12B to the removable media 125 (step 1213). For example, if the file F12B is an inside-organization input file, the file operation monitoring module 350 performs alert processing.

FIG. 13A shows a configuration of the input source DB 393.

The input source DB 393 includes for each file, as described above, a file name 1301, a mail sender name 1302, and a file hash value 1303.

FIG. 13B shows an example of the input source identifier 1311 to be assigned to the file 204 stored in the local file system 209.

The input source identifier 1311 can be realized, as described above, as data of an int file format by using an "alternate stream" if it is Microsoft's NTFS (NT File System). If the file is a file that is input from the email server 114, the sender's mail address is indicated in the "From" line in the input source identifier 1311 of that file. If the file is a file that is input from the file server 115, the server name of the file server 115 or the IP address is indicated in the "Server" line in the input source identifier 1311 of that file. If the file is a file that is input from the inside-organization Web server, the URL of the download source of the file is indicated in the "URL" line in the input source identifier 1311 of that file. Any unused lines may be erased or the space after the equal sign may be left blank.

In this embodiment, the information contained in the input source identifier 1311 maybe included in the alert. Moreover, the information (input time information) representing the time that the file was input to the client PC 121 may also be included in the input source identifier 1311. Consequently, in addition to information concerning from where the file to be output was input, information (input time information) representing when that file was input can also be included in the alert.

In order to realize the above, the input source DB 393 may be registered with information (input time information), for each file, representing the time that the mail with an attachment was received. Here, the TCP communication monitoring module 360 may register the reception time indicated in the mail header in the input source DB 393 at step 606 or 706, and include the input time information represented in the input source DB 393 in the input source identifier 1311 at step 610 or 710 for acquiring the file attribute.

Figure 14:
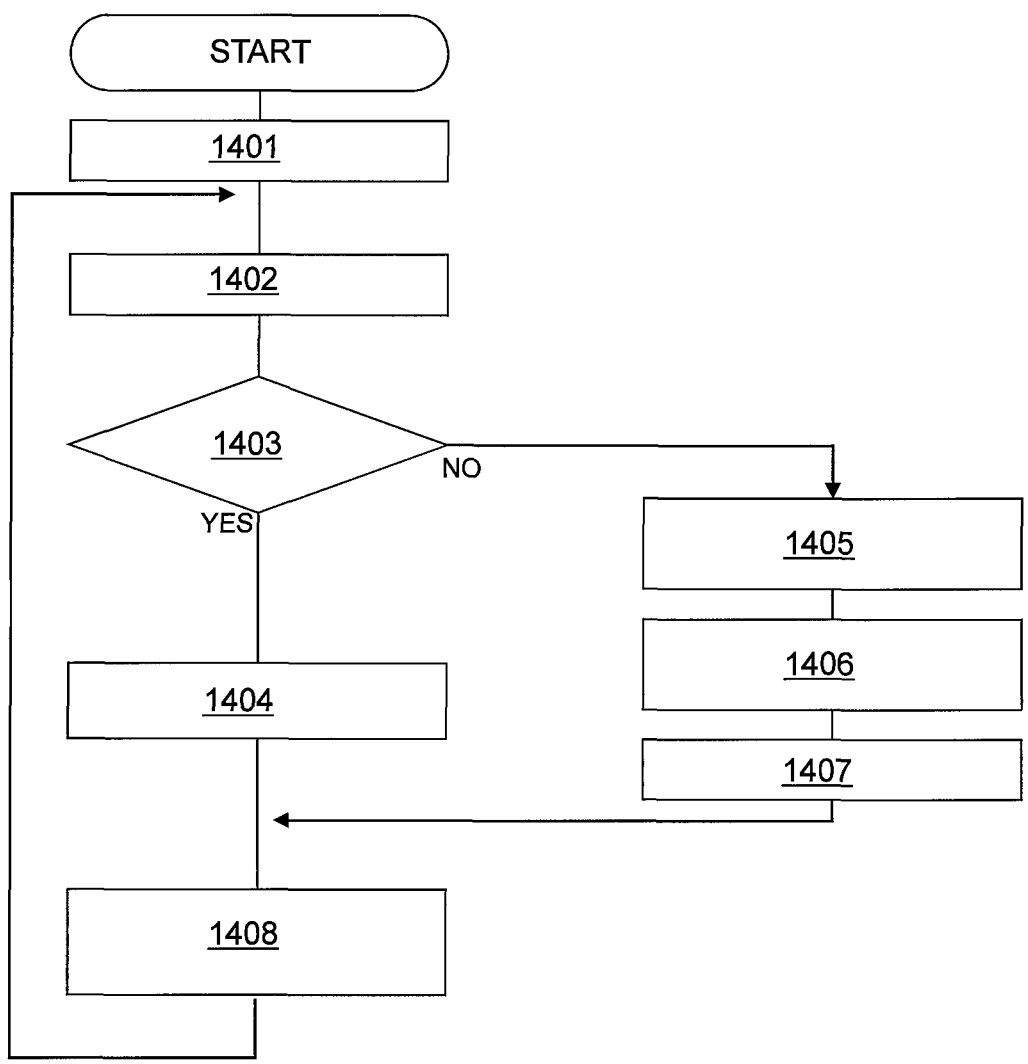
FIG. 14 shows the flow of the processing to be executed by the browser monitoring module 330.

FIG. 14 shows the flow of the processing to be executed by the browser monitoring module 330.

The browser monitoring module 330 is activated at the timing that the Web browser is activated, configures the monitoring of the user operation event in the Web browser (step 1401), and enters a loop for determining the occurrence of an event (step 1402).

If the occurrence of an event is detected, the browser monitoring module 330 determines whether page transition was performed based on the user's left click operation (step 1403).

If the page transition was performed based on the user's left click operation, the browser monitoring module 330 acquires the URL information after the transition (step 1404), and thereafter sends that URL information to the dialog monitoring module 340 (step 1404).

Meanwhile, if the page transition was not performed, the browser monitoring module 330 performs a step of acquiring the coordinate information on the browser of the mouse event from the file operation monitoring module 350 (step 1405), a step of acquiring an HTML anchor tag located below the mouse cursor (step 1406), and a step of extracting the URL that was selected with the mouse cursor (step 1407), and thereafter sends the URL to the dialog monitoring module 340 (step 1404).

Figure 15:
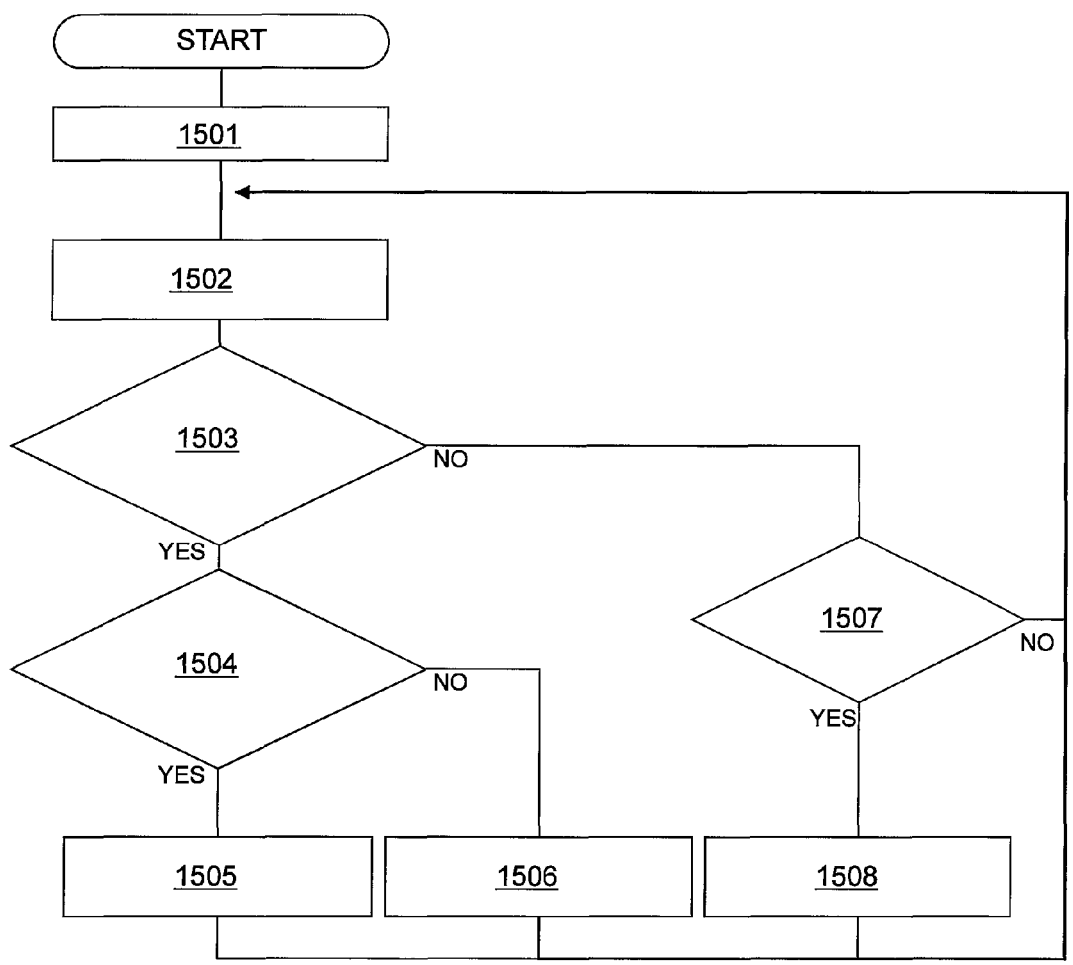
FIG. 15 shows the flow of the processing to be executed by the dialog operation monitoring module 340.

FIG. 15 shows the flow of the processing to be executed by the dialog operation monitoring module 340.

The dialog operation monitoring module 340 is activated at the timing that the user logs onto the client PC 121, and uses the dialog (dialog explained with reference to FIG. 4 and so on) and monitors the file operation. The dialog operation monitoring module 340 monitors, after performing, for example, the setup of timer monitoring or the like (step 1501), the event that displays a dialog (step 1502).

If an event occurs, the dialog operation monitoring module 340 checks whether the upload dialog or the download dialog is displayed (step 1503). If a dialog is displayed, the dialog operation monitoring module 340 determines the type of application program that displayed the dialog (step 1504). If the application program is consequently a mailer, the dialog operation monitoring module 340 creates a mailer check thread (step 1505). Meanwhile, if the application program is a Web browser, the dialog operation monitoring module 340 creates a Web browser check thread (step 1506).

Moreover, at step 1503, if the displayed dialog is not an upload dialog or a download dialog, the dialog operation monitoring module 340 determines whether the displayed dialog is a print dialog (step 1507), and creates a print check thread (step 1508).

After performing the steps for creating the respective threads, the dialog operation monitoring module 340 monitors an event that will display a dialog (step 1502).

Figure 16:
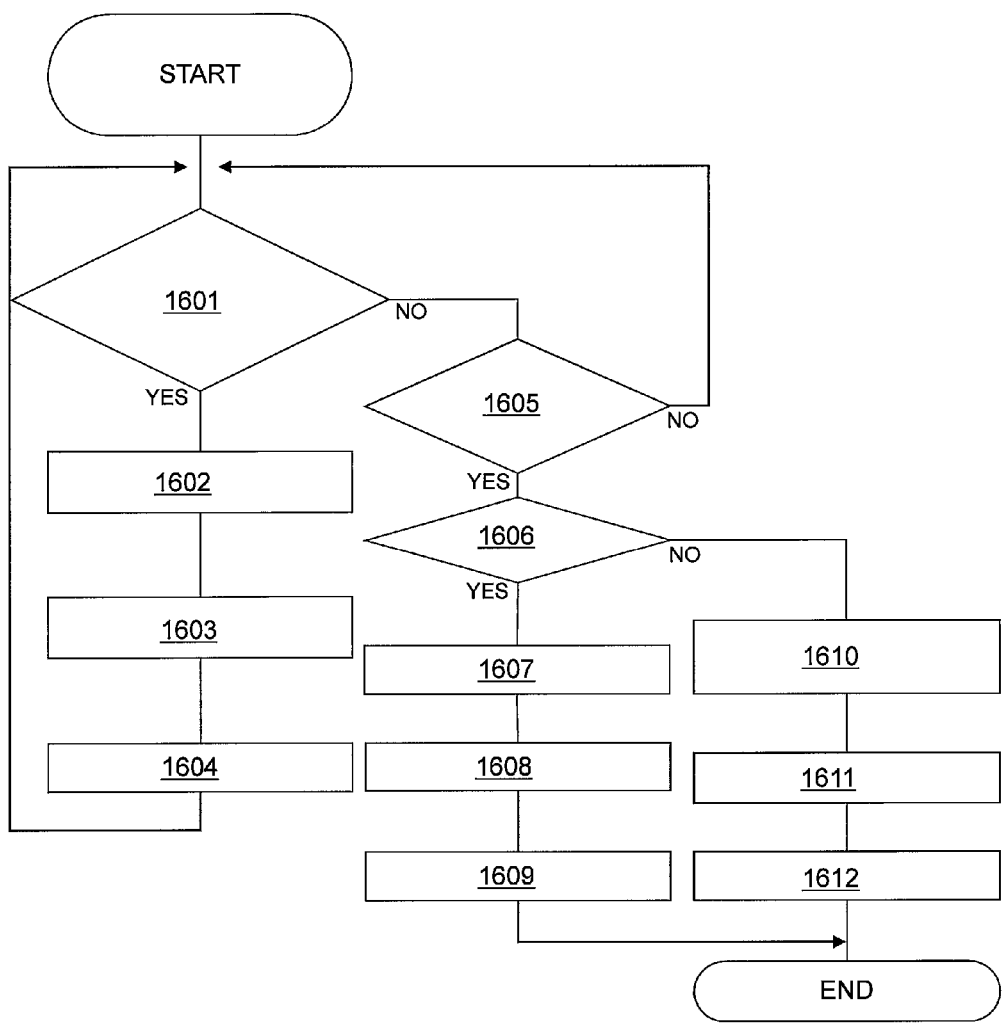
FIG. 16 shows the flow of the processing according to the mailer check thread that was created in the processing of FIG. 15.

FIG. 16 shows the flow of the processing according to the mailer check thread that was created in the processing of FIG. 15.

With this thread, the dialog operation monitoring module 340 checks whether an upload dialog or a download dialog is displayed (step 1601). If a dialog is displayed, the dialog operation monitoring module 340 acquires the folder name and the file name from the string displayed in the dialog (steps 1602 and 1603). The dialog operation monitoring module 340 uses the folder name and the file name to configure the full path of the file to be uploaded or downloaded (step 1604), and thereafter once again performs step 1601.

When the user thereafter clicks the save button or the like of the dialog and the dialog is no longer displayed, the dialog operation monitoring module 340 executes the processing from step 1605 onward.

Foremost, the dialog operation monitoring module 340 determines whether a full path has been configured as a result of step 1604 being previously executed and whether there is a file shown with that full path (referred to as a "target file" in the explanation of FIG. 16) (step 1605). If there is a target file, the dialog operation monitoring module 340 executes the processing of step 1606 onward, and, if there is no target file, once again executes step 1601.

If there is a target file, the dialog operation monitoring module 340 determines whether the displayed dialog (display dialog) is a download dialog (step 1606). If the display dialog is a download dialog, the dialog operation monitoring module 340 calculates the hash value of the target file (step 1607). The TCP communication monitoring module 360 thereafter searches for information registered in the input source DB (step 1608), and, if conditions such as the input source being a different inside-organization user are satisfied, writes the input source identifier in the target file (step 1609).

If the display dialog is an upload dialog, the dialog operation monitoring module 340 waits for a notification from the TCP communication monitoring module 360 (step 1610). If the file designated in the display dialog is attached to a mail and sent, the dialog operation monitoring module 340 reads the input source identifier from the target file (step 1611). The dialog operation monitoring module 340 performs security processing (alert processing, for example) if the input source specified from the input source identifier and the output destination of the target file coincide with the security processing definition represented with the security policy 392 (step 1612).

The security processing definition of the security policy 392 may include, for example, the information of (x) to (z) below:
(x) conditions of the input source,
(y) conditions of the output destination, and
(z) type of security processing to be performed.
(x) and/or (y) maybe general conditions such as inside-organization or outside-organization, or detailed conditions (for example, email address, URL or IP address). Moreover, (z) may be either alert processing or prohibition (discontinuation) of output.

Figure 17:
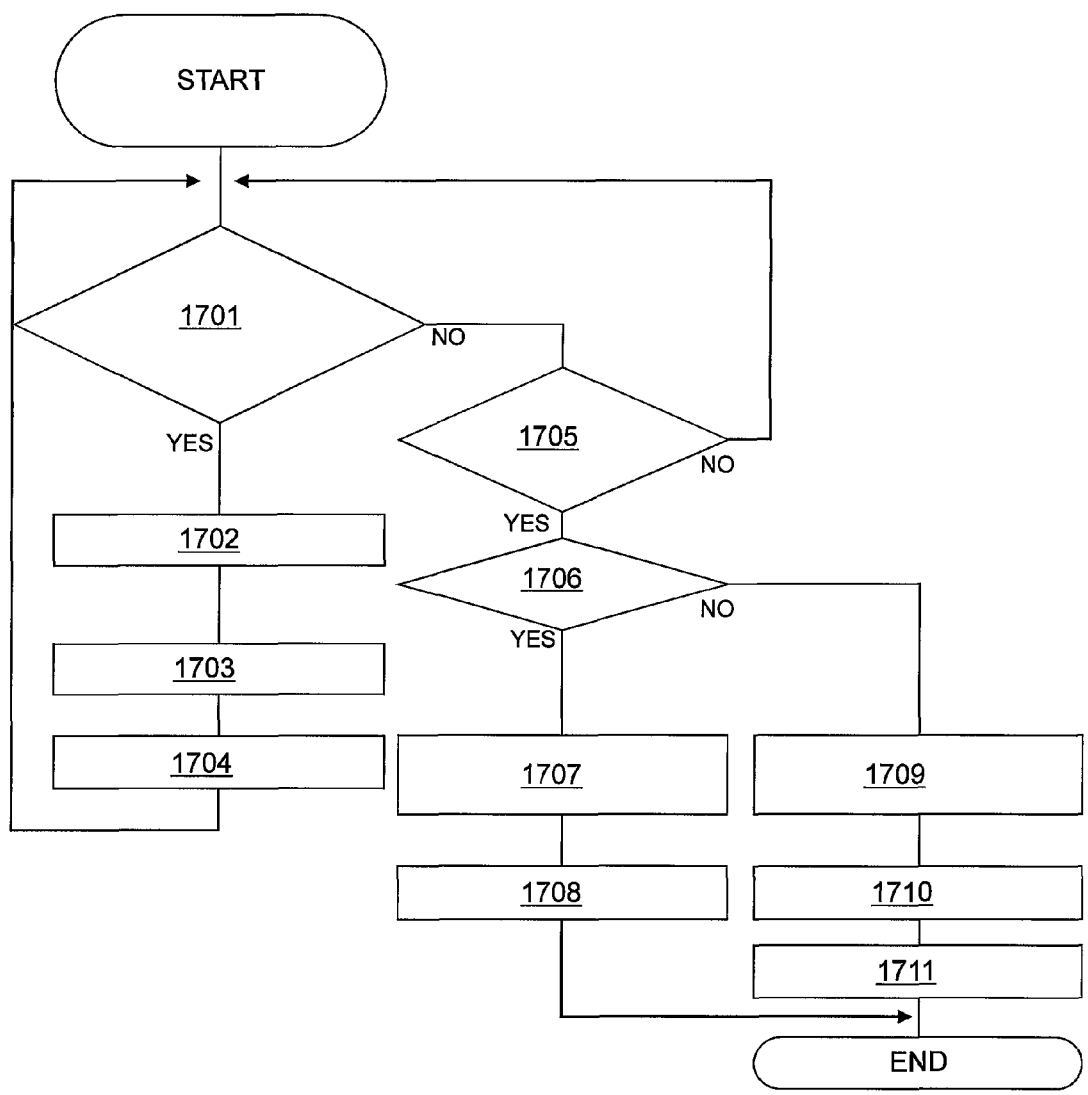
FIG. 17 shows the flow of the processing according to the Web browser check thread that was created in the processing of FIG. 15.

FIG. 17 shows the flow of the processing according to the Web browser check thread that was created in the processing of FIG. 15.

With this thread, the dialog operation monitoring module 340 checks whether an upload dialog or a download dialog is displayed (step 1701). If a dialog is displayed, the dialog operation monitoring module 340 acquires the folder name and the file name from the string displayed in the dialog (steps 1702 and 1703). The dialog operation monitoring module 340 uses the folder name and the file name to configure the full path of the file to be uploaded or downloaded (step 1704), and then performs step 1701. When the user thereafter clicks the save button or the like of the dialog and the dialog is no longer displayed, the dialog operation monitoring module 340 executes the processing from step 1705 onward.

The dialog operation monitoring module 340 determines whether a full path has been configured as a result of step 1704 being previously executed and whether there is a file shown with that full path (referred to as a "target file" in the explanation of FIG. 17) (step 1705). If there is a target file, the dialog operation monitoring module 340 executes the processing of step 1706 onward, and, if there is no target file, executes step 1701.

If there is a target file, the dialog operation monitoring module 340 determines whether the displayed dialog (display dialog) is a download dialog (step 1706). If the display dialog is a download dialog, the dialog operation monitoring module 340 inputs the download source information retained in the browser monitoring module 330 (step 1707). The dialog operation monitoring module 340 writes the input source identifier into the target file if conditions such as the input source being a different inside-organization user are satisfied (step 1708).

If the display dialog is an upload dialog, the dialog operation monitoring module 340 inputs the upload destination information retained in the browser monitoring module 330 from the browser monitoring module 330 (step 1709). When the target file designated in the dialog is sent, the dialog operation monitoring module 340 reads the input source identifier of the target file (step 1710). The dialog operation monitoring module 340 performs security processing (alert processing, for example) if the input source specified from the input source identifier and the output destination of the target file coincide with the security processing definition represented with the security policy 392 (step 1711).

Figure 18:
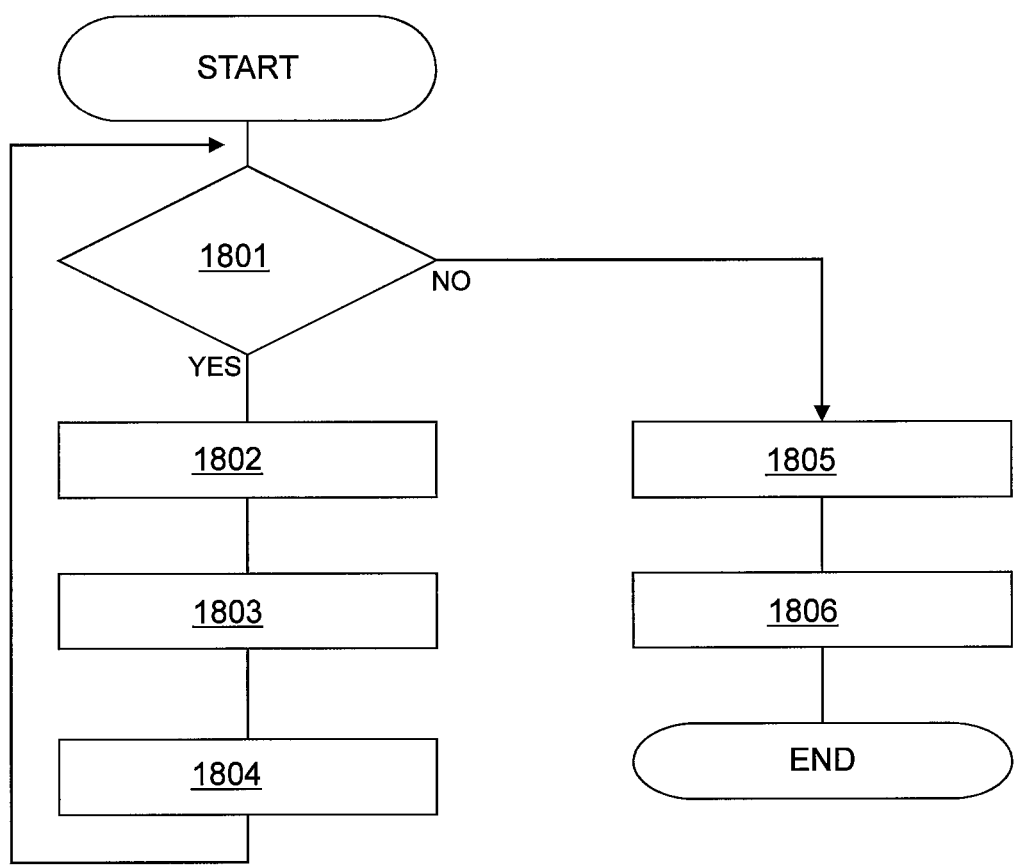
FIG. 18 shows the flow of the processing according to the print check thread that was created in the processing of FIG. 15.

FIG. 18 shows the flow of the processing according to the print check thread that was created in the processing of FIG. 15.

With this thread, the dialog operation monitoring module 340 checks whether a print dialog is displayed (step 1801). If a dialog is displayed, the dialog operation monitoring module 340 acquires the ID of the process of the application program that commanded the printing operation (step 1802). The dialog operation monitoring module 340 acquires the file name from the file list that is opened by that process (step 1803), creates a full path of the print target file (step 1804), and then executes step 1801.

When the user thereafter clicks the print button or the like of the dialog and the dialog is no longer displayed, the dialog operation monitoring module 340 reads the input source identifier from the print target file (step 1805). The dialog operation monitoring module 340 performs security processing (alert processing, for example) if the input source specified from the input source identifier coincides with the security processing definition represented with the security policy 392 (step 1806).

Figure 19:
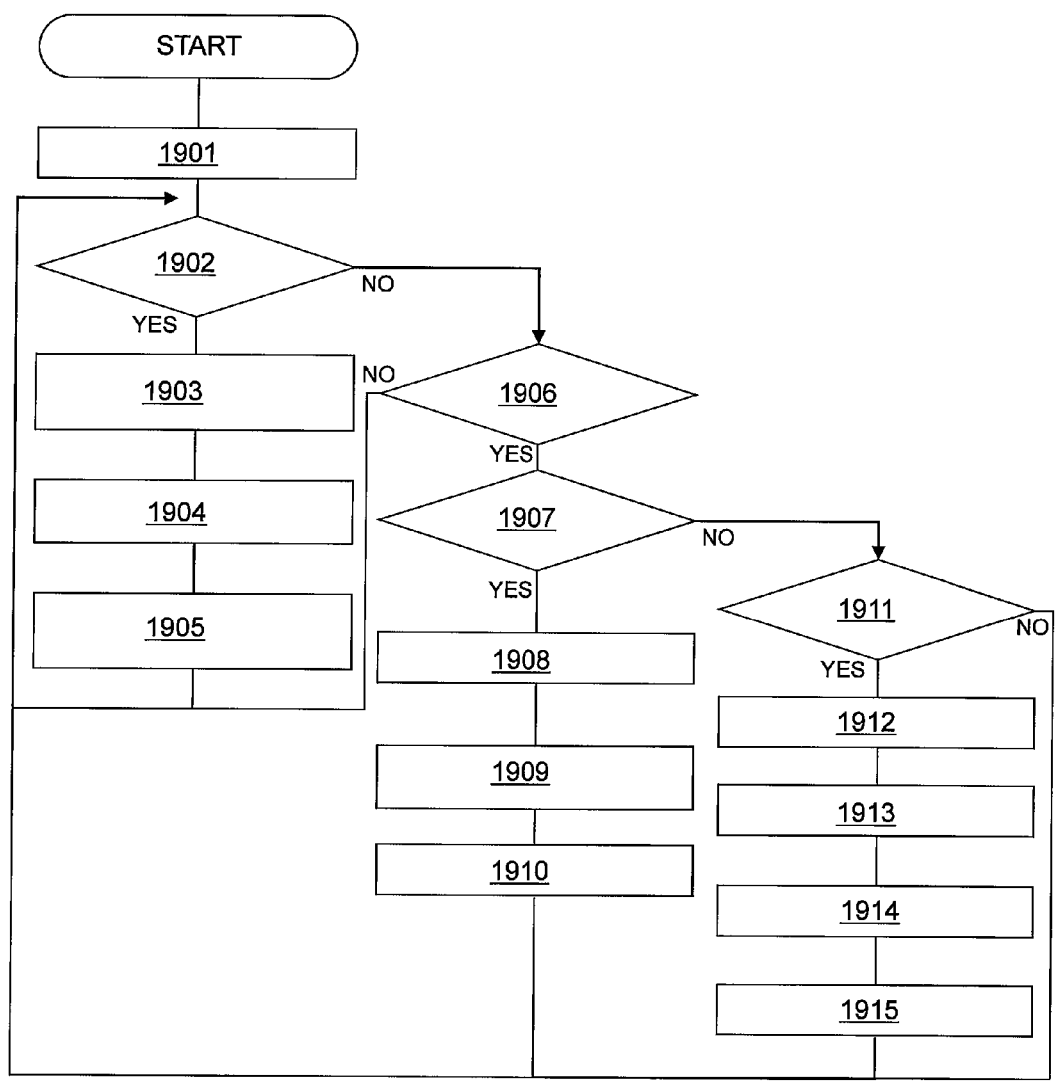
FIG. 19 shows the flow of the processing to be executed by the file operation monitoring module 350.

FIG. 19 shows the flow of the processing to be executed by the file operation monitoring module 350.

The file operation monitoring module 350 is activated at the timing that the user logs onto the client PC 121. The file operation monitoring module 350 starts the hook of a mouse event (step 1901), and the file operation monitoring module 350 thereafter monitors a file operation (user operation to the file) using a mouse. If a file operation (event) is detected, the file operation monitoring module 350 determines whether the detected file operation is a right click (step 1902).

If the file operation is a right click, the file operation monitoring module 350 acquires the mouse cursor coordinates in the foreground window (step 1903), and executes conversion processing to the coordinates of the browser window (step 1904). The file operation monitoring module 350 notifies the coordinates acquired at step 1904 to the browser monitoring module 330 (step 1905), and once again returns to monitoring an event.

Meanwhile, at step 1902, if the file operation is not a right click, the file operation monitoring module 350 determines whether it is a drag event (step 1906). If the file operation is not a drag event, the file operation monitoring module 350 once again returns to monitoring an event.

If the file operation is a drag event, the file operation monitoring module 350 detects an event where the dragged file is dropped. The file operation monitoring module 350 determines whether the file that was dragged on the file explorer was dropped on the mailer (step 1907).

If the determination at step 1907 is a positive result (step 1907: Yes), the file operation monitoring module 350 acquires the full path of that file (step 1908), and reads the input source identifier of the file shown with the full path (step 1909). The file operation monitoring module 350 performs security processing (alert processing, for example) if the input source specified from the input source identifier coincides with the security processing definition represented with the security policy 392 (step 1910).

If the determination at step 1907 is a negative result (step 1907: No), the file operation monitoring module 350 determines whether the drag & drop event is an event of the file being dragged on the mailer and dropped on the file explorer (step 1911).

If the determination at step 1911 is a negative result (step 1911: No), the file operation monitoring module 350 once again returns to monitoring an event. If the determination at step 1911 is a positive result (step 1911: Yes), the file operation monitoring module 350 acquires the file path of the file drop destination (step 1912). Subsequently, the file operation monitoring module 350 calculates the hash value of the file shown with the file path that was acquired at step 1912 (step 1913). The file operation monitoring module 350 specifies the sender name corresponding to the hash value that coincides with the foregoing hash value from the input source DB (step 1914), and writes the input source identifier into the file shown with the full path that was acquired at step 1912 if conditions such as the specified sender name (input source) being a different inside-organization user are satisfied (step 1915).

Note that, in the processing shown in FIG. 12, if the drag source is the file server 115 and the drop destination is the local file system 209, the file operation monitoring module 350 should perform the same processing as step 1912 and step 1915. Moreover, if the drag source is the local file system 209 and the drop destination is a removable media, the file operation monitoring module 350 should perform the same processing as step 1908 and step 1910. In addition, if the drag source is the file server 115 and the drop destination is a removable media, the file operation monitoring module 350 should perform the same processing as step 1910.

Figure 20:
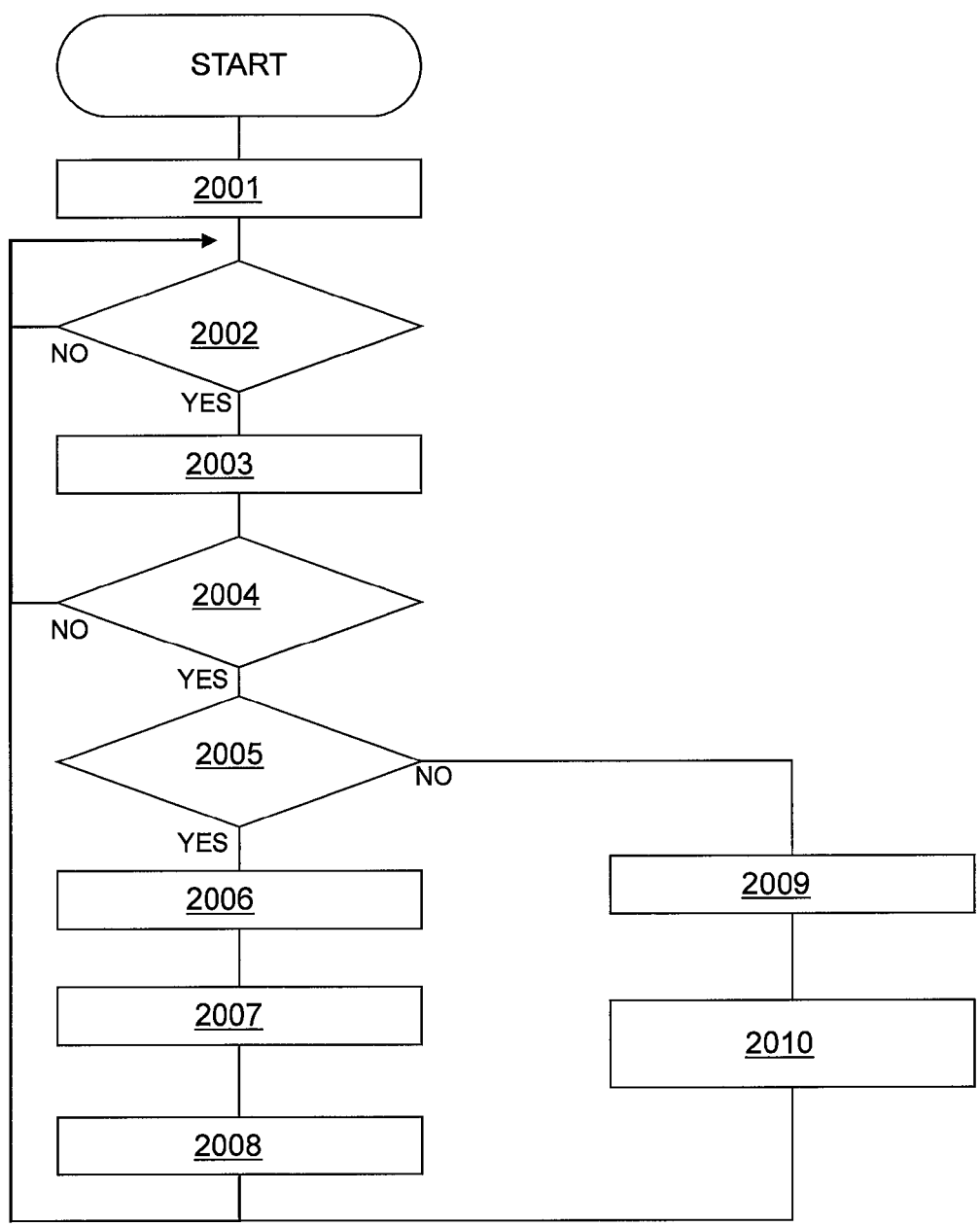
FIG. 20 shows the flow of the processing to be executed by the TCP communication monitoring module 360.

FIG. 20 shows the flow of the processing to be executed by the TCP communication monitoring module 360.

The TCP communication monitoring module 360 is activated at the timing that the user logs onto the client PC 121, and monitors the data that is communicated according to one or more prescribed protocols (for example, SMTP, POP 3, IMAP 4). The TCP communication monitoring module 360 starts monitoring the socket communication (step 2001), and determines whether data was communicated with a prescribed protocol (step 2002).

If the determination at step 2002 is a negative result (step 2002: No), the TCP communication monitoring module 360 once again returns to monitoring the socket communication. If the determination at step 2002 is a positive result (step 2002: Yes), the TCP communication monitoring module 360 performs the processing of step 2003 onward.

At step 2003, the TCP communication monitoring module 360 analyzes the mail. Consequently, the TCP communication monitoring module 360 is able to specify the sender and the recipient based on the header area of the mail, and specify the existence of an attachment and the file name based on the MIME (Multipurpose Internet Mail Extension) part.

Subsequently, the TCP communication monitoring module 360 determines whether the mail has an attachment (step 2004).

If the determination at step 2004 is a positive result (step 2004: Yes), the TCP communication monitoring module 360 additionally determines whether the protocol type is a mail reception protocol (for example, POP 3 or IMAP 4) (step 2005).

If the determination at step 2005 is a positive result (step 2005: Yes), the TCP communication monitoring module 360 specifies the sender name and the attachment name from the incoming email (step 2006). The TCP communication monitoring module 360 decodes the attachment and thereafter calculates the hash value (step 2007), and registers the attachment name and the hash value in the input source DB 393. The TCP communication monitoring module 360 thereafter once again returns to monitoring the socket communication.

Meanwhile, if the determination at step 2005 is a negative result (if the protocol type is a mail sending protocol (SMTP, for example)) (step 2005: No), the TCP communication monitoring module 360 acquires the destination information and the attachment name from the outgoing email (step 2009). The TCP communication monitoring module 360 sends the information acquired at step 2009 to the dialog monitoring module 350 and the file monitoring module 360.

Based on the foregoing configuration and processing, the present system is able to identify that a file that was input into the client PC 121 from a device, which is different from a monitoring target, to a device that is a verification target. As the operation of inputting the file into the client PC 121, for example, there are the following operations:
(1) operation of downloading the file using the Web browser,
(2) operation of saving the file attached to the received mail in the local file system 209, and
(3) operation of saving (copying or migrating) the file from the file server to the local file system 209 with the file explorer. With all of the foregoing operations, an input source identifier is assigned to the input file.

There is a file system program (for example, Microsoft's NTFS) comprising a function of assigning, even if the file that was input into the local file system of the client PC 121 is processed (for example, subject to copying, name change or migration), an input source identifier to the processed file (for example, the copied file). As an operation for outputting the file, for example, there are the following operations:
(1) operation of uploading the file using the Web browser,
(2) operation of sending a mail with a file attachment,
(3) operation for printing information contained in the file, and
(4) operation for saving (copying or migrating) the file to a removable media.

When an output operation is performed, security processing (alert processing, for example) may be performed.

The conditions (conditions representing information contained in the security policy) for performing security processing (alert processing, for example) may also be the conditions concerning the information contained in the input source identifier. For example, if the file to be output is a file that was downloaded using the Web browser, the foregoing conditions may be such that the input source identifier of the file to be output represents an inside-organization Web server. For example, if the agent 122 is able to identify the Web server storing an important file based on information (URL, for example) contained in the input source identifying information, the foregoing conditions may be such that the input source identifier includes the URL of a specific Web server.

Moreover, the foregoing conditions may also contain at least one among the time of performing the output operation, time frame of performing the output operation, type of file to be output, and size of the file to be output.

According to this embodiment, after the user inputs a file created by a different inside-organization user (a different inside-organization client PC 121) into one's own client PC 121, the operation of outputting such file outside-organizationly can be detected as fraudulent manipulation. This kind of file could be confidential information. Accordingly, it is possible to detect an operation of high risk where confidential information may be leaked as fraudulent manipulation. When such fraudulent manipulation is detected, the administrator is able to output an alert (or prohibit the output of the file).

EXAMPLE 2

The second embodiment of the present invention is now explained. Here, the differences with the first embodiment are mainly explained, and the explanation regarding the common points with the first embodiment is omitted or simplified.

In this embodiment, the conditions corresponding to fraudulent manipulation can be flexibly changed by the client PC administrator (hereinafter referred to as the "administrator") (for example, a person in the information center 101). Specifically, for example, the administrator is able to change the conditions described in the security policy 392. The security policy 392 (and system policy 391) described above may be stored, for example, in the storage resource of the management server 111 created by the administrator. The manager 112 may send the security policy 392 (and system policy 391) to the client PC 121. The agent 122 may store the security policy 392 (and system policy 391) from the management server 111 in the local file system 209.

According to this embodiment, for example, in cases where the client PC is able to access the inside-organization Web server and the outside-organization Web server, the agent 122 can create an alert and send such alert to the management server 111 only upon sending the file downloaded from the inside-organization Web server to the outside-organization Web server. Moreover, if the client PC is to store the file downloaded from the outside-organization Web server in the inside-organization Web server, the agent 122 can refrain from creating an alert. In other words, whether or not to perform security processing (for example, whether to create an alert) can be flexibly changed according to the usage status (input source and output destination of the file).

If the control according to the second embodiment is not performed, numerous alerts may occur and, therefore, the administrator may have difficulty in confirming the important alert.

This embodiment is now explained in further detail.

Figure 23:
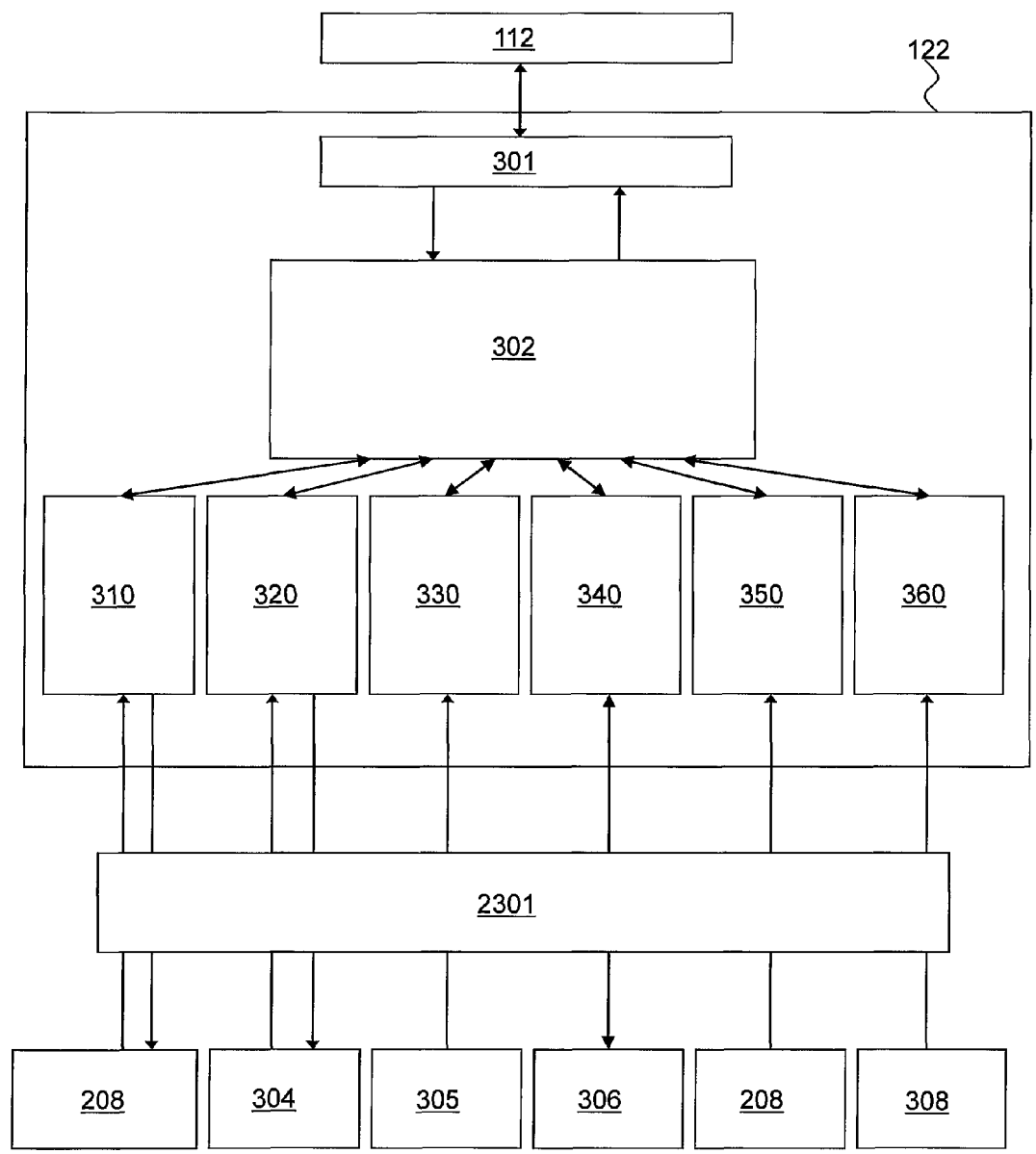
FIG. 23 shows a functional block diagram of the client PC according to the second embodiment.

FIG. 23 shows a functional block diagram of the client PC according to the second embodiment.

There is a fraudulent manipulation detection filter 2301. The fraudulent manipulation detection filter 2301 separates the input source and output destination, and the client's management area. The placement of the fraudulent manipulation detection filter 2301 is an image, and in a practical sense the fraudulent manipulation detection filter 2301 is essentially a security policy. By changing the conditions indicated in the security policy, the conditions of the fraudulent manipulation to be alerted can be changed.

Figure 24:
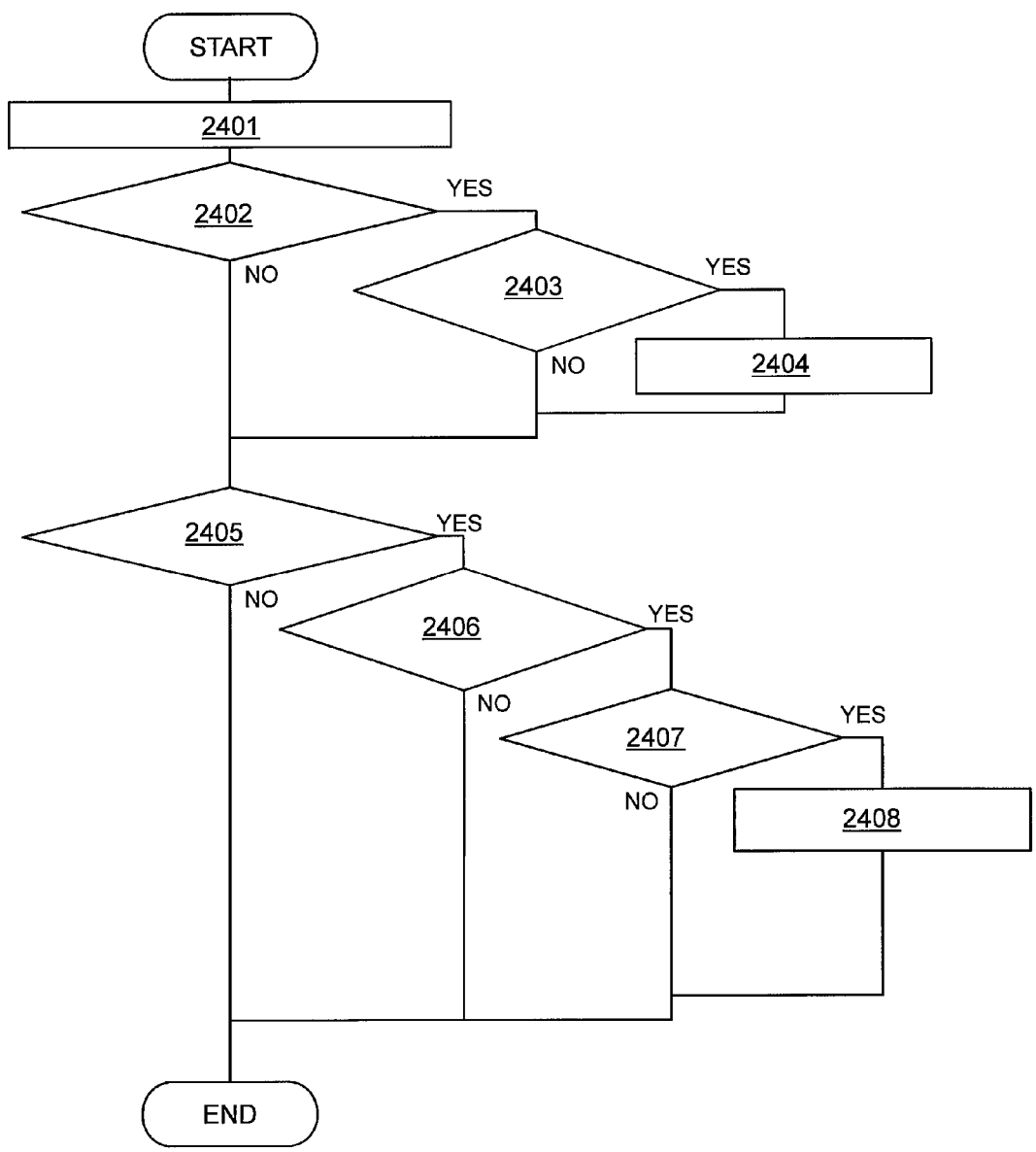
FIG. 24 shows the flow of the fraudulent manipulation processing to be performed by the agent according to the second embodiment.

FIG. 24 shows the flow of the fraudulent manipulation processing to be performed by the agent according to the second embodiment.

At step 2401, the agent 122 detects a user operation. The agent 122 may create a log regarding the detected user operation. In the explanation of FIG. 24, the user operated detected at step 2401 is referred to as a "target user operation" and the log of the target user operation is referred to as a "target log."

Subsequently, at step 2402, the agent 122 checks whether the target user operation is an operation of inputting the file from the input source to the management area (for example, an operation of inputting the file from outside the organization to inside the organization).

If the determination at step 2402 is a positive result (step 2402: Yes), at step 2403, the agent 122 determines whether the target user operation corresponds to a fraudulent manipulation condition (conditions described in the security policy).

If the determination at step 2403 is a positive result (step 2403: Yes), at step 2404, the agent 122 sets the fraudulent manipulation check flag to ON. The fraudulent manipulation check flag exists, for example, in the target log. The target log may be sent to the management server 111 by the agent 122, and the manager 112 may add the received target log to the operation log storage table shown in FIG. 29 (for example, the table stored in the storage resource of the management server 111).

If the determination at step 2402 is a negative result (step 2402: No), if the determination at step 2403 is a negative result (step 2403: No), or if step 2404 is performed, step 2405 is performed. At step 2405, the agent 122 determines whether the target user operation is an operation of outputting the file from the management area to the output destination (for example, operation of outputting the file from inside the organization to outside the organization).

If the determination at step 2405 is a positive result (step 2405: Yes), at step 2406, the agent 122 determines whether the target user operation corresponds to a fraudulent manipulation condition (conditions described in the security policy).

If the determination at step 2406 is a positive result (step 2406: Yes), at step 2407, the agent 122 determines whether the fraudulent manipulation check flag corresponding to the target user operation is ON.

If the determination at step 2407 is a positive result (step 2407: Yes), the agent 122, at step 2408, creates an alert and sends the created alert to the management server 111. Here, the manager 112 in the management server 111 receives the alert from the client PC 121 and displays the received alert on the display device 2208 and/or stores it in the storage resource of the management server 111.

According to the foregoing flow, the following will occur.

(*) If the target user operation is an operation for inputting the file from the input source to the management area but does not correspond to a fraudulent manipulation condition, the processing is ended since step 2403 is No and step 2405 is also No.

(*) If the target user operation is an operation for outputting the file from the management area to the output destination, step 2402 is No and step 2405 is performed.

(*) If the target user operation is an operation for outputting the file from the management area to the output destination but does not correspond to a fraudulent manipulation condition, the processing is ended since step 2402 is No, step 2405 is Yes, and step 2406 is No.

(*) If the target user operation is an operation for outputting the file from the management area to the output destination and corresponds to a fraudulent manipulation condition, but the fraudulent manipulation check flag corresponding to the file input operation is OFF, the processing is ended since step 2402 is No, step 2405 is Yes, step 2406 is Yes, and step 2407 is No. In other words, an alert is not created even if the file output operation corresponds to a fraudulent manipulation condition.

The security policy is, for example, information containing the combination of information shown in FIG. 25 to FIG. 27.

According to FIG. 25, the user operation types (operation log acquisition items) are described in the security policy. As the operation log acquisition items, there are, for example, Web upload and download, file sending and receiving via FTP, sending, receiving and saving of mail with an attachment. Note that the contents of these items can be freely changed by the administrator.

FIG. 26 shows the information that is associated with the record X (recording corresponding to file copy or file migration) in the information shown in FIG. 25.

The information shown in FIG. 26 shows the relationship of the type of storage device as the input source and the type of storage device in the management area. In FIG. 26, "O" represents that the operation corresponds to fraudulent manipulation. Accordingly, for example, the file copy in which both the storage device as the input source and the storage device in the management area are local drives (for example, hard disk drives built into the client PC) is determined as not corresponding to fraudulent manipulation. Meanwhile, for example, the file copy in which the storage device as the input source is a remote drive (a network drive, for example) and the storage device in the management area is a local drive is determined as corresponding to fraudulent manipulation.

FIG. 27 shows the information that is associated with the record Y (recording corresponding to file copy or file migration) in the information shown in FIG. 25.

The information shown in FIG. 27 shows the relationship of the type of storage device as the output destination and the type of storage device in the management area. In FIG. 27, "O" represents that the operation corresponds to fraudulent manipulation. Accordingly, for example, the file copy in which both the storage device as the output destination and the storage device in the management area are local drives is determined as not corresponding to fraudulent manipulation. Meanwhile, for example, the file copy in which the storage device as the output destination is a removable drive (a USB-coupled flash memory, for example) and the storage device in the management area is a local drive is determined as corresponding to fraudulent manipulation.

Figure 28:
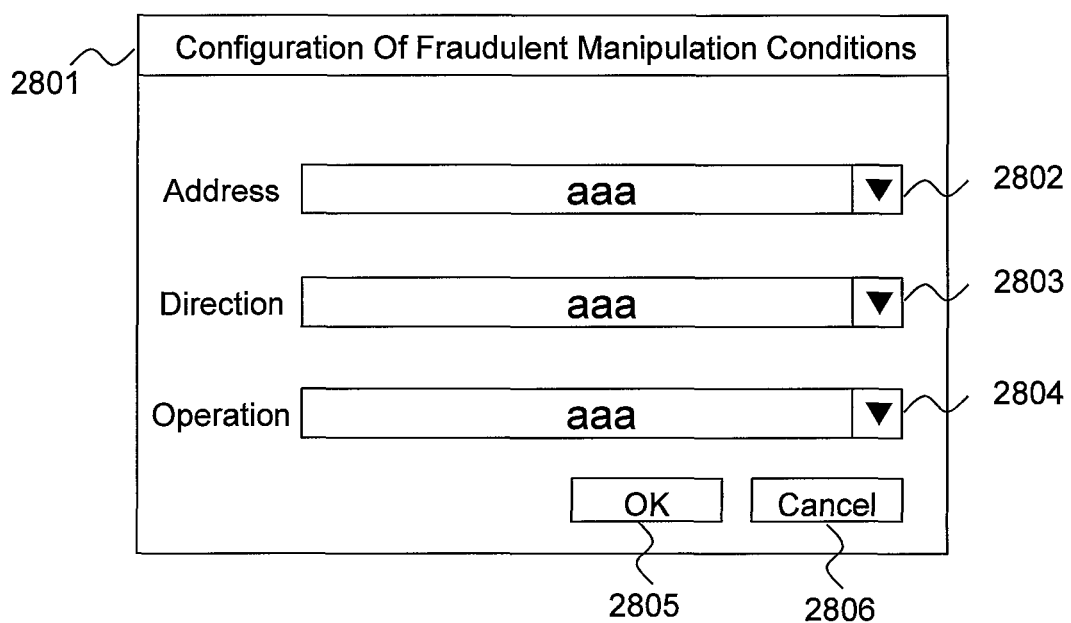
FIG. 28 shows an example of the screen for configuring the conditions for the security policy.

FIG. 28 shows an example of the screen for configuring the conditions for the security policy.

The screen 2801 is a screen for configuring the conditions of the email address of the input source and/or output destination.

The administrator configures a string (hereinafter referred to as the "mail address string") as a part (or all) of the email address (domain, for example) in the address configuration column 2802.

For example, if the email address of the source of the email to which the file is attached includes a mail address string that was configured via the screen 2801, the fraudulent manipulation check flag is set to ON. If the email address of the destination of the email to which the file is attached including a mail address string that was configured via the screen 2801, and the fraudulent manipulation check flag is set to ON regarding the input operation corresponding to that file, the sending of that email is determined as fraudulent manipulation.

Moreover, in the case of a screen for performing monitoring configuration such as the FTP sending/receiving and Web upload/download, regardless of whether it is a private address or a global address, a part (or all) of the URL (domain, for example) may be configured. The configured string is hereinafter referred to as the "URL string." If the URL corresponding to the input source contains the configured URL string, for example, the fraudulent manipulation check flag is set to ON.

Information representing the checking direction is configured in the direction configuration column 2803. The term "direction" as used herein refers to the direction of the flow of the file. Specifically, there are three types of directions; namely, the direction from the "input source to the management area"; the direction from the "management area to the output destination"; and both of the foregoing directions.

Whether to determine an operation as fraudulent manipulation when it is checked with the foregoing configuration is configured in the operating configuration column 2804.

When information is configured in the foregoing configuration columns 2802, 2803 and 2804 and the OK button 2805 is pressed, such information is configured in the security file. Meanwhile, if the cancel button 2806 is pressed, the information configured in the configuration columns 2802, 2803 and 2804 is cancelled.

Let it be assumed that the following information is configured in the screen 2801 and the OK button 2805 is pressed:
the administrator's arbitrary email address is configured in the configuration column 2802,
"input source to management area" is configured in the configuration column 2803, and
"deemed fraudulent manipulation" is configured in the configuration column 2804.

When the foregoing information is configured as described above and a mail with an attachment is sent to the client PC with the configured email address as the source, the fraudulent manipulation check flag is set to ON since there is a possibility of fraudulent manipulation.

FIG. 29 shows a configuration of the operation log storage table.

The operation log storage table is stored, for example, in the storage resource of the management server 111. One line of the operation log storage table corresponds to one operation log. The manager 112 of the management server 111 receives the operation log from one or more management target client PCs of the management server 111, and adds that operation log to the operation log storage table.

The operation log includes, for example, the following information as shown in FIG. 29:
"operation date and time" representing the date and time that the user operation was detected,
"client identifier" as the identifier of the client PC that detected the user operation,
"operation type" and "operation type sub code" representing the user operation that was detected, and
fraudulent manipulation check flag.

With the fraudulent manipulation check flag, "1" means ON and "NULL" means OFF. Based on the combination of "operation type" and "operation type sub code," it is possible to specify the detected user operation. An example of the combination of "operation type" and "operation type sub code" is as shown in FIG. 32.

The plurality of acquired operation logs are displayed as a list on the display device 2208 of the management server 111 as shown in FIG. 30. The items of information displayed as a list may also be arbitrarily selected by the administrator. Moreover, if fraudulent manipulation is detected and an alert has occurred regarding the operation log, the manager 112 may also display the alert together with the operation log.

In addition, the manager 112 may display the screen shown in FIG. 31 in substitute for in addition to the screen shown in FIG. 30. The screen shown in FIG. 31 is based on the operation log accumulated in the storage resource of the management server 111 and the alert.

According to this embodiment, it is possible to determine, as fraudulent manipulation, only the user operation that is likely to be fraudulent manipulation for the administrator based on the security policy configured by the administrator.

Thus, it is anticipated that the administrator will not overlook an important alert as a result of numerous alerts being created. Specifically, it is possible to realize a function of being able to determine fraudulent manipulation only when a specific operation is performed while reducing the risk of information leakage.

Moreover, according to this embodiment, the conditions for determining what kind of user operation is considered fraudulent manipulation can be configured in detail and/or flexibly.

In addition, according to this embodiment, the filter (conditions) concerning the file input from the input source to the management area and the filter (conditions) concerning the file output from the management area to the output destination can be configured independently. Thus, the agent 121 is able to determine fraudulent manipulation regarding various user operations.

For example, configuration of only monitoring the download from a specific site for the file input from the input source to the management area, and configuration where no limitation is provided for uploads and monitoring only the sending and receiving of email attachments, regardless of whether such sending and receiving is inside-organization or outside-organization, for the file output from the management area to the output destination are possible. As described above, the operations to be monitored can be varied based on the combination of configurations.

Several embodiments of the present invention were described above, but it goes without saying that this invention is not limited to these embodiments, and may be various modified to an extent that does not deviate from the gist of the invention.

For example, the operation log of the detected user operation may be created by necessity regardless of whether the detected user operation is fraudulent manipulation.

Moreover, for example, a private address may be assigned to the inside-organization server and a global address may be assigned to the outside-organization server.

In addition, for example, the inside-organization server may be a server to which is assigned an IP address within the IP address range designated by the administrator, and the outside-organization server may be a server to which is assigned an IP address outside the IP address range designated by the administrator.

Furthermore, the outside-organization server may also be a second server that may be used as the upload destination of the file by a user other than the users who are permitted to access (download from, for example) the first server. To put it differently, the outside-organization server may be a second server that may be used as the download source of the file by a user other than the users who are permitted to access (upload to, for example) the first server.

Moreover, for example, the agent 121 may constantly perform security processing if an input source identifier is not assigned to the file to be output (that is, if the input source is unknown).

In addition, for example, the security policy may include a first policy corresponding to the first input from the input source to the management area, and a second policy corresponding to the file output from the management area to the output destination.

Furthermore, for example, the security policy may include information representing the conditions for acquiring the operation log of the detected user operation. If the detected user operation corresponding to the foregoing conditions, the agent 121 may create an operation log of that user operation.

Moreover, the information shown in FIG. 26 and FIG. 27 may include an identifier (for example, IP address, URL, server name) of a server (for example, inside-organization Web server, file server, email server, outside-organization Web server) that can be accessed by the client PC 121 in substitute for or in addition to the information representing the type of storage device as the information representing the input source, the management area and the output destination.

In addition, for example, in the case of the file input from the input source to the management area (local file system 209, for example), an operation log may not be created, and an input source identifier may not be assigned to the input file.

Furthermore, for example, the alert may include at least information representing the input source of the file or information representing the output destination of the file regarding the user operation corresponding to that alert.

Moreover, for example, the correspondence of the attached file and the input or sent file may be specified with a method that is separate from the method for acquiring the hash value. In addition, if the similarity of the attached file and the input or sent file is a predetermined value or higher, the attached file and the input or sent file may be deemed to be the same.

REFERENCE SIGNS LIST

111 . . . Management server, 121 . . . Client PC

The invention claimed is:

1. A non-transitory computer readable medium storing therein at least one application program, which, when executed, causes a client computer, which comprises a computer used by a user in a prescribed group and a storage resource, to perform a method for detecting a fraudulent manipulation, the method comprising:

(A) detecting a user operation for transmitting data exporting information to a server or a storage device;

(B) determining whether the user operation detected in (A) is the fraudulent manipulation based on first policy information and second policy information wherein:

(B1) the first policy information includes (x1) an identifier of a server coupled to the client computer, or information representing a type of storage device coupled to the client computer, (B2) for each of the identifier or information of (x1), the first policy information includes (y1) information representing whether to deem a user operation for importing information from the server or the storage device coupled to the client computer in a storage resource of the client computer as a monitoring target, (B3) the second policy information includes (x2) an identifier of a server coupled to the client computer, or information representing the type of storage device coupled to the client computer, and (B4) for each of the identifier or information of (x2), the second policy information includes (y2) information representing whether to deem a user operation for exporting information in the storage resource of the client computer to the server or the storage device coupled to the client computer as a verification target; and (C) creating an alert when a determination in (B) is a positive result and sending the alert to a management server, or performing security processing which is processing of prohibiting the exporting information, wherein, when the exporting information is created within the group and when a destination of the exporting information data is a server or a storage device outside the group, the determination in (B) is a positive result;

wherein the at least one application program stores and accesses a file in the client computer, the at least one application program including a mail program, and wherein the method further comprises:

(1) receiving a first part of the user importing operation for receiving mail data and a second part of a user importing operation for saving an attached file of the mail data, and importing first information from a first server into the file according to the user importing operation, with:

(1a) storing a source identifier designating a source of the first information, in a metadata of the file;

saving the attached file into the file;

acquiring a sender's address from mail data and storing the sender's address as the source identifier in the metadata of the file;

by a program module watching TCP connection, calculating a hash value about the attached file upon receiving the mail data and storing a combination of the hash value, the sender's address, and a filename of the attached file, to a database, which is a different area of the metadata of the file; and by another program module detecting the second part of the user importing operations for saving the attached file, acquiring the sender's address by comparing:

a filename of the attached filename detected by the another program module, and the filename in the database; and a hash value calculated by the another program module and the hash value in the database; and (2) receiving a user exporting operation for attaching the file to a new mail and sending the new mail, and exporting information in the file to a second server, according to the user exporting operation designating the file and export destination, with:

(2a) acquiring the source identifier from the metadata of the file for the processing of (B) and (C), and acquiring an addressee of the new mail as the identifier of the export destination.

2. The non-transitory computer readable medium according to claim 1,
wherein, in (A), when exporting information is imported from a server or a storage device in the group and when the destination of the exporting information is a server or a storage device within the group, the determination in (B) is a negative result.

3. The non-transitory computer readable medium according to claim 1,
wherein, in (A), when the exporting information is imported from a server or a storage device outside the group, the determination in (B) is a negative result.

4. The non-transitory computer readable medium according to claim 1, the method further comprising:
(E1) displaying a configuration screen for receiving from an administrator an input of information to be configured in the first or second policy information, and
(E2) updating the first policy information and second policy information based on the inputted information, wherein during displaying the configuration screen, the client computer is configured to receive inputs of data direction representing either an importing or exporting and information concerning the server or the storage device,
wherein when the data direction is importing, the first policy information is updated in (E2); and wherein when the data direction is exporting, the second policy information is updated in (E2).

5. The non-transitory computer readable medium according to claim 1,
wherein the alert includes information representing at least either one of an import source or an export destination of the data.

6. The non-transitory computer readable medium according to claim 1,
wherein when an import source of the data is unknown, (C) is performed.

7. The non-transitory computer readable medium according to claim 1,
wherein, in (A),
(a1) an input operation which is a user operation for inputting the data into the storage resource of the client computer is detected,
wherein, in (B),
(b1) whether the input operation detected in (a1) is the fraudulent manipulation is determined based on the first policy information,
wherein, in (A),
(a2) a transmission operation which is a user operation for transmitting data from the storage resource of the client computer to a server or a storage device is detected,
wherein, in (B),
(b2) whether the transmission operation detected in (a2) is a fraudulent manipulation is determined based on the second policy information,
wherein, when the determination in (b2) is a positive result and the determination in (b1) is a positive result regarding the data that is subject to the transmission operation, (C) is performed.

8. The Non-transitory computer readable medium according to claim 1, wherein the at least one application program includes a Web browser, wherein the processes (1) and (1a) further comprise:
receiving the user importing operation which is a pointing a link or an object in a first Web contents displayed by the Web browser;
saving the first information designated by the pointed link or object into the file; and acquiring a source URL designated by the pointed link or object and storing the source URL as the source identifier in the metadata of the file, and
wherein the processes (2) and (2a) further comprise:
receiving the user exporting operation of the designation of a filename of the file on a second Web contents; and
acquiring a destination URL of another Web contents, which is transmitted from the second Web contents after the user exporting operation, as the identifier of the exports destination.

9. The Non-transitory computer readable medium according to claim 8, wherein the source URL is a URL of a Web contents transmitted from the first Web contents and designated by the pointed link.

10. A computer used by a user in a prescribed group and coupled to a server or a storage device, comprising:
a storage resource; and
a processor coupled to the storage resource,
wherein the processor is configured to:
(A) detect a user operation for transmitting data exporting information to a server or a storage device;
(B) determine whether the user operation detected in (A) is the fraudulent manipulation based on first policy information and second policy information wherein:
(B1) the first policy information includes (x1) an identifier of a server coupled to the client computer, or information representing a type of storage device coupled to the client computer, (B2) for each of the identifier or information of (x1), the first policy information includes (y1) information representing whether to deem a user operation for importing information from the server or the storage device coupled to the client computer in a storage resource of the client computer as a monitoring target, (B3) the second policy information includes (x2) an identifier of a server coupled to the client computer, or information representing the type of storage device coupled to the client computer, and (B4) for each of the identifier or information of (x2), the second policy information includes (y2) information representing whether to deem a user operation for exporting information in the storage resource of the client computer to the server or the storage device coupled to the client computer as a verification target; and (C) creating an alert when a determination in (B) is a positive result and sending the alert to a management server, or performing security processing which is processing of prohibiting the exporting information, wherein, when the exporting information is created within the group and when a destination of the exporting information data is a server or a storage device outside the group, the determination in (B) is a positive result;

at least one application program storing and accessing a file in the computer, the at least one application program includes a mail program, and wherein the processor is further configured to:

(1) receive a first part of the user importing operation for receiving mail data and a second part of a user importing operation for saving an attached file of the mail data, and import first information from a first server into the file according to the user importing operation, with:

(1a) storing a source identifier designating a source of the first information, in a metadata of the file;

saving the attached file into the file;

acquiring a sender's address from mail data and storing the sender's address as the source identifier in the metadata of the file;

by a program module watching TCP connection, calculating a hash value about the attached file upon receiving the mail data and storing a combination of the hash value, the sender's address, and a filename of the attached file, to a database, which is a different area of the metadata of the file; and by another program module detecting the second part of the user importing operations for saving the attached file, acquiring the sender's address by comparing:

a filename of the attached filename detected by the another program module, and the filename in the database; and a hash value calculated by the another program module and the hash value in the database; and (2) receive a user exporting operation for attaching the file to a new mail and sending the new mail, and export information in the file to a second server, according to the user exporting operation designating the file and export destination, with:

(2a) acquiring the source identifier from the metadata of the file for the processing of (B) and (C), and acquiring an addressee of the new mail as the identifier of the export destination.

11. The computer according to claim 10, wherein, in (A), when exporting information is imported from a server or a storage device in the group and when the destination of the exporting information is a server or a storage device within the group, the determination in (B) is a negative result.

12. The computer according to claim 10, wherein, in (A), when the exporting information is imported from a server or a storage device outside the group, the determination in (B) is a negative result.

13. The computer according to claim 10, wherein the processor is further configured to:

(E1) display a configuration screen for receiving from an administrator an input of information to be configured in the first or second policy information, and (E2) update the first policy information and second policy information based on the inputted information, wherein during displaying the configuration screen, the computer is configured to receive inputs of data direction representing either an importing or exporting and information concerning the server or the storage device, wherein when the data direction is importing, the first policy information is updated in (E2); and wherein when the data direction is exporting, the second policy information is updated in (E2).

14. The computer according to claim 10, wherein the alert includes information representing at least either one of an import source or an export destination of the data.

15. The computer according to claim 10, wherein when an import source of the data is unknown, the processor is configured to perform (C).

16. The computer according to claim 10, wherein, in (A), (a1) an input operation which is a user operation for inputting the data into the storage resource of the client computer is detected, wherein, in (B), (b1) whether the input operation detected in (a1) is the fraudulent manipulation is determined based on the first policy information, wherein, in (A), (a2) a transmission operation which is a user operation for transmitting data from the storage resource of the client computer to a server or a storage device is detected, wherein, in (B), (b2) whether the transmission operation detected in (a2) is a fraudulent manipulation is determined based on the second policy information, wherein, when the determination in (b2) is a positive result and the determination in (b1) is a positive result regarding the data that is subject to the transmission operation, the processor is configured to perform (C).

17. The computer according to claim 10, wherein the at least one application program comprises a Web browser, wherein the processor in the processes (1) and (1a) is further configured to:

receive the user importing operation which is a pointing a link or an object in a first Web contents displayed by the Web browser;

save the first information designated by the pointed link or object into the file; and acquire a source URL designated by the pointed link or object and storing the source URL as the source identifier in the metadata of the file, and wherein the processor in the processes (2) and (2a) is further configured to:

receive the user exporting operation of the designation of a filename of the file on a second Web contents; and
acquire a destination URL of another Web contents, which is transmitted from the second Web contents after the user exporting operation, as the identifier of the exports destination.

18. The computer according to claim 17, wherein the source URL is a URL of a Web contents transmitted from the first Web contents and designated by the pointed link.

* * * * *